(12) United States Patent
Henne et al.

(10) Patent No.: US 8,083,171 B2
(45) Date of Patent: Dec. 27, 2011

(54) SUPERSONIC AIRCRAFT FOR REDUCING SONIC BOOM EFFECTS AT GROUND LEVEL

(75) Inventors: Preston A. Henne, Hilton Head Island, SC (US); Donald C. Howe, Savannah, GA (US); Robert R. Wolz, Savannah, GA (US); Jimmy L. Hancock, Jr., Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 1124 days.

(21) Appl. No.: 11/754,276

(22) Filed: May 26, 2007

(65) Prior Publication Data

US 2010/0012777 A1      Jan. 21, 2010

Related U.S. Application Data

(60) Continuation of application No. 11/307,280, filed on Jan. 30, 2006, now abandoned, which is a division of application No. 10/708,404, filed on Mar. 1, 2004, now abandoned, which is a continuation-in-part of application No. PCT/US03/02631, filed on Jan. 30, 2003, and a continuation-in-part of application No. 10/104,403, filed on Mar. 22, 2002, now Pat. No. 6,698,684, each which is a continuation-in-part of application No. 10/060,656, filed on Jan. 30, 2002, now abandoned.

(51) Int. Cl.
*B64C 23/04* (2006.01)
(52) U.S. Cl. .......................... 244/1 N; 244/13; 244/130
(58) Field of Classification Search .................. 244/1 N, 244/13, 130
See application file for complete search history.

(56) References Cited

U.S. PATENT DOCUMENTS

| 1,785,477 | A | 12/1930 | Cooney |
| 1,805,994 | A | 5/1931 | Niemeyer |
| 2,874,922 | A | 2/1959 | Whitcomb |
| 2,916,230 | A | 12/1959 | Nial |
| 2,920,446 | A | 1/1960 | Ranard |
| 2,960,293 | A | 11/1960 | Besson |
| 2,966,028 | A | 12/1960 | Johnson et al. |
| 2,970,431 | A | 2/1961 | Harshman |

(Continued)

FOREIGN PATENT DOCUMENTS

GB         2070139         9/1981

(Continued)

OTHER PUBLICATIONS

Gokhale, et al. "Numerical computations of supersonic inlet flow," International Journal for Numerical Methods in Fluids 2001; 36: 597-617.

(Continued)

*Primary Examiner* — Rob Swiatek
(74) *Attorney, Agent, or Firm* — King & Spalding

(57) ABSTRACT

Method for configuring and operating an aircraft for minimizing sonic boom effects at ground level during supersonic flight of the aircraft. The method includes configuring an aircraft and flying the aircraft at supersonic speed so that in the supersonic flight, a lower profile of the aircraft is presented and generally groundwardly directed; and generating multiple different magnitude pressure disturbances below the aircraft, and radiating therebelow, and controlling the different magnitude pressure disturbances generated below the aircraft so that differentials thereamong are sufficiently minimized that ground level sonic boom effects are minimized during the supersonic flight.

22 Claims, 26 Drawing Sheets

U.S. PATENT DOCUMENTS

| | | |
|---|---|---|
| 2,971,330 A | 2/1961 | Clark |
| D191,019 S | 8/1961 | Thieblot |
| 2,995,320 A | 8/1961 | Gottschalk |
| D191,930 S | 12/1961 | Cella |
| 3,032,977 A | 5/1962 | Neitzel |
| 3,067,578 A | 12/1962 | Goodall et al. |
| 3,188,025 A | 6/1965 | Moorehead |
| D202,311 S | 9/1965 | Rellis |
| 3,242,671 A | 3/1966 | Moorehead |
| D206,299 S | 11/1966 | Rellis |
| 3,302,657 A | 2/1967 | Bullock |
| 3,412,962 A | 11/1968 | Killian |
| 3,417,767 A | 12/1968 | Young |
| 3,425,650 A | 2/1969 | Silva |
| 3,447,325 A | 6/1969 | Tiley |
| 3,447,761 A | 6/1969 | Whitener et al. |
| 3,450,141 A | 6/1969 | Braendlein |
| D215,894 S | 11/1969 | Rellis |
| 3,478,989 A | 11/1969 | Bielefeldt |
| 3,489,375 A | 1/1970 | Rethorst |
| 3,490,556 A | 1/1970 | Bennett, Jr. et al. |
| 3,497,163 A * | 2/1970 | Wakefield .............. 244/13 |
| 3,643,901 A | 2/1972 | Patapis |
| 3,647,160 A | 3/1972 | Alperin |
| 3,655,147 A | 4/1972 | Preuss |
| 3,709,446 A | 1/1973 | Espy |
| 3,737,119 A | 6/1973 | Cheng |
| 3,776,489 A | 12/1973 | Wen et al. |
| 3,794,274 A | 2/1974 | Eknes |
| 3,799,475 A | 3/1974 | Mitchell et al. |
| 3,941,336 A | 3/1976 | Nangia |
| 3,971,535 A | 7/1976 | Jones |
| 4,037,808 A | 7/1977 | Kaniut |
| 4,055,041 A | 10/1977 | Adamson et al. |
| 4,114,836 A | 9/1978 | Graham et al. |
| 4,172,574 A | 10/1979 | Spillman |
| 4,176,813 A | 12/1979 | Headley et al. |
| 4,189,939 A | 2/1980 | West et al. |
| 4,240,597 A | 12/1980 | Ellis et al. |
| 4,272,043 A | 6/1981 | Spillman |
| 4,307,743 A | 12/1981 | Dunn |
| 4,311,289 A | 1/1982 | Finch |
| 4,318,328 A | 3/1982 | Rona |
| 4,327,581 A | 5/1982 | Jackson et al. |
| 4,378,922 A | 4/1983 | Pierce |
| 4,390,150 A | 6/1983 | Whitener |
| 4,598,886 A | 7/1986 | Friebel et al. |
| 4,641,796 A | 2/1987 | Feifel |
| 4,650,139 A | 3/1987 | Taylor |
| 4,691,879 A | 9/1987 | Greene |
| 4,691,881 A | 9/1987 | Gioia |
| 4,706,902 A | 11/1987 | Destuynder et al. |
| 4,718,620 A | 1/1988 | Braden et al. |
| 4,723,214 A | 2/1988 | Frei |
| 4,750,693 A | 6/1988 | Lobert et al. |
| 4,815,680 A | 3/1989 | Goldhammer |
| 4,907,765 A | 3/1990 | Hirschel et al. |
| 4,949,269 A | 8/1990 | Buisson et al. |
| 4,989,406 A | 2/1991 | Vdoviak et al. |
| 5,072,894 A | 12/1991 | Cichy |
| 5,114,099 A | 5/1992 | Gao |
| 5,115,999 A | 5/1992 | Buchsel et al. |
| 5,133,519 A | 7/1992 | Falco |
| 5,143,320 A | 9/1992 | Boyadjian |
| 5,216,878 A | 6/1993 | Klees |
| 5,251,846 A | 10/1993 | Rethorst |
| 5,275,360 A | 1/1994 | Porter et al. |
| 5,311,735 A | 5/1994 | Orlando |
| 5,322,242 A | 6/1994 | Tracy |
| D349,271 S | 8/1994 | Inoue et al. |
| 5,341,677 A | 8/1994 | Maris |
| 5,358,156 A | 10/1994 | Rethorst |
| 5,526,999 A | 6/1996 | Meston |
| 5,676,333 A | 10/1997 | Rethorst |
| 5,731,995 A | 3/1998 | Benne et al. |
| 5,738,156 A | 4/1998 | Stewart |
| 5,740,984 A | 4/1998 | Morgenstern |
| 5,794,887 A | 8/1998 | Komerath et al. |
| 5,796,612 A | 8/1998 | Palmer |
| 5,797,563 A | 8/1998 | Blackburn et al. |
| 5,842,666 A | 12/1998 | Gerhardt et al. |
| 5,875,998 A | 3/1999 | Gleine et al. |
| 5,897,076 A | 4/1999 | Tracy |
| 5,934,607 A | 8/1999 | Rising et al. |
| 5,947,422 A | 9/1999 | Wille |
| 5,971,000 A | 10/1999 | Koncsek et al. |
| D417,184 S | 11/1999 | Hartmann et al. |
| 5,992,797 A | 11/1999 | Seidel et al. |
| D428,381 S | 7/2000 | Hartmann et al. |
| 6,098,923 A | 8/2000 | Peters |
| 6,102,328 A | 8/2000 | Kumata et al. |
| D431,522 S | 10/2000 | Fujino |
| 6,149,101 A | 11/2000 | Tracy |
| 6,161,802 A | 12/2000 | Cunningham, Jr. |
| 6,216,063 B1 | 4/2001 | Lind et al. |
| 6,253,126 B1 | 6/2001 | Palmer |
| 6,283,407 B1 | 9/2001 | Hakenesch |
| 6,308,913 B1 | 10/2001 | Fujino et al. |
| 6,336,060 B1 | 1/2002 | Shigemi |
| 6,341,247 B1 | 1/2002 | Hreha et al. |
| 6,424,923 B1 | 7/2002 | Huyer et al. |
| 6,487,848 B2 | 12/2002 | Zysman et al. |
| 6,698,684 B1 | 3/2004 | Henne et al. |
| 6,793,175 B1 | 9/2004 | Sanders et al. |
| 6,854,687 B1 | 2/2005 | Morgenstern et al. |
| 6,905,091 B2 | 6/2005 | Berson et al. |
| 6,971,000 B1 | 11/2005 | Sinharoy et al. |
| 7,048,229 B2 | 5/2006 | Sanders et al. |
| 7,168,236 B2 | 1/2007 | Schmotolocha et al. |
| 7,207,520 B2 | 4/2007 | Lundy et al. |
| 7,252,263 B1 | 8/2007 | Hagemeister et al. |
| 7,322,179 B2 | 1/2008 | Kobayashi et al. |
| 2002/0088276 A1 | 7/2002 | Omotani et al. |
| 2004/0031258 A1 | 2/2004 | Papamoschou |
| 2008/0271787 A1 | 11/2008 | Henne et al. |
| 2009/0107557 A1 | 4/2009 | Conners |
| 2010/0043389 A1 | 2/2010 | Conners |

FOREIGN PATENT DOCUMENTS

| | | |
|---|---|---|
| JP | 09-291850 | 11/1997 |
| WO | WO 2009/045108 | 4/2008 |
| WO | WO 2009/055041 | 4/2009 |
| WO | WO 2009/085380 | 7/2009 |

OTHER PUBLICATIONS

Emani, et al., "Experimental Investigation of Inlet-Combustor Isolators for a Dual-Mode Scramjet at a Mach Number of 4," NASA Technical Paper 3502, May 1995.

AIAA 2006-30, 2006, Conners et al., Supersonic Inlet Shaping for Dramatic Reductions in Drag and Sonic Boom Strength, pp. 1-24.

NASA Conference Publication 3027, 1988 C. Darden et al., Status of Sonic Boom Methodology and Understanding.

AIAA Report 91-3103, 1991, G. Haglund and Boeing Commercial Airplane Group, HSCT Designs for Reduced Sonic Boom.

AIAA-98-2956, 1998, R. Seebass and B. Agrow, Sonic Boom Minimization Revisited.

1952, G. Whitman, The Flow Pattern of a Supersonic Projectile (from Communications on Pure and Applied Math, vol. V, 301-348.).

1955, G. Whitman, On the Propogation of Weak Shock Waves.

AIAA 68-159, 1968, A. George, Reduction of Sonic Boom by Azimuthal Redistribution of Overpressure.

NASA Technical Note D-1494, 1962, H. Carlson, The Lower Bound of Attainable Sonic-Boom Overpressure and Design Methods of Approaching This Limit.

NASA Technical Report TR-213, 1964, H. Carlson, Correlation of Sonic-Boom Theory With Wind-Tunnel and Flight Measurements.

NASA Technical Note TN D-2877, F. McLean, Some Nonasymptotic Effects on the Sonic Boom of Large Airplanes.

NASA Technical Note TN D-5148, 1969, R. Barger, Investigation of a Class of Bodies that Generate Far-Field Sonic-Boom Shock Strength and Impulse Independent of a Body Length and Volume.

NASA Technical Note TN D-7218, 1973, H. Carlson, Application of Sonic-Boom Minimization Concepts in Supersonic Transport Design.

NASA Technical Note TN D-7842, 1975, C. Darden, Minimization of Sonic-Boom Parameters in Real and Isothermal Atmospheres.

NASA Technical paper 1348, 1979, C, Darden, Sonic-Boom Minimization with Nose-Bluntness Relaxation.

NASA Technical Paper 1421, 1979, R. Mack, Wind-Tunnel Investigation of the Validity of Sonic-Boom-Minimization Concept.

NASA Technical Note TN D-7160, 1973, L. Hunton, Some Effects of Wing Planform on Sonic Boom.

NASA Technical Note TN D-6832, 1972, C. Thomas, Extrapolation of Sonic Boom Pressure Signatures by the Waveform Parameter Method.

Paper abstract, K. Plotkin, Wyle Laboratories, Sonic Boom Minimization: Myth or Reality; 1992.

NASA SP-147, 1967, A.R. Seebass, Sonic Boom Research.

NASA SP 180, 1968, Edited by I. Schwartz, Second Conference on Sonic Boom Research.

NASA SP-255, 1971, Edited by I. Schwartz, Third Conference on Sonic Boom Research.

* cited by examiner

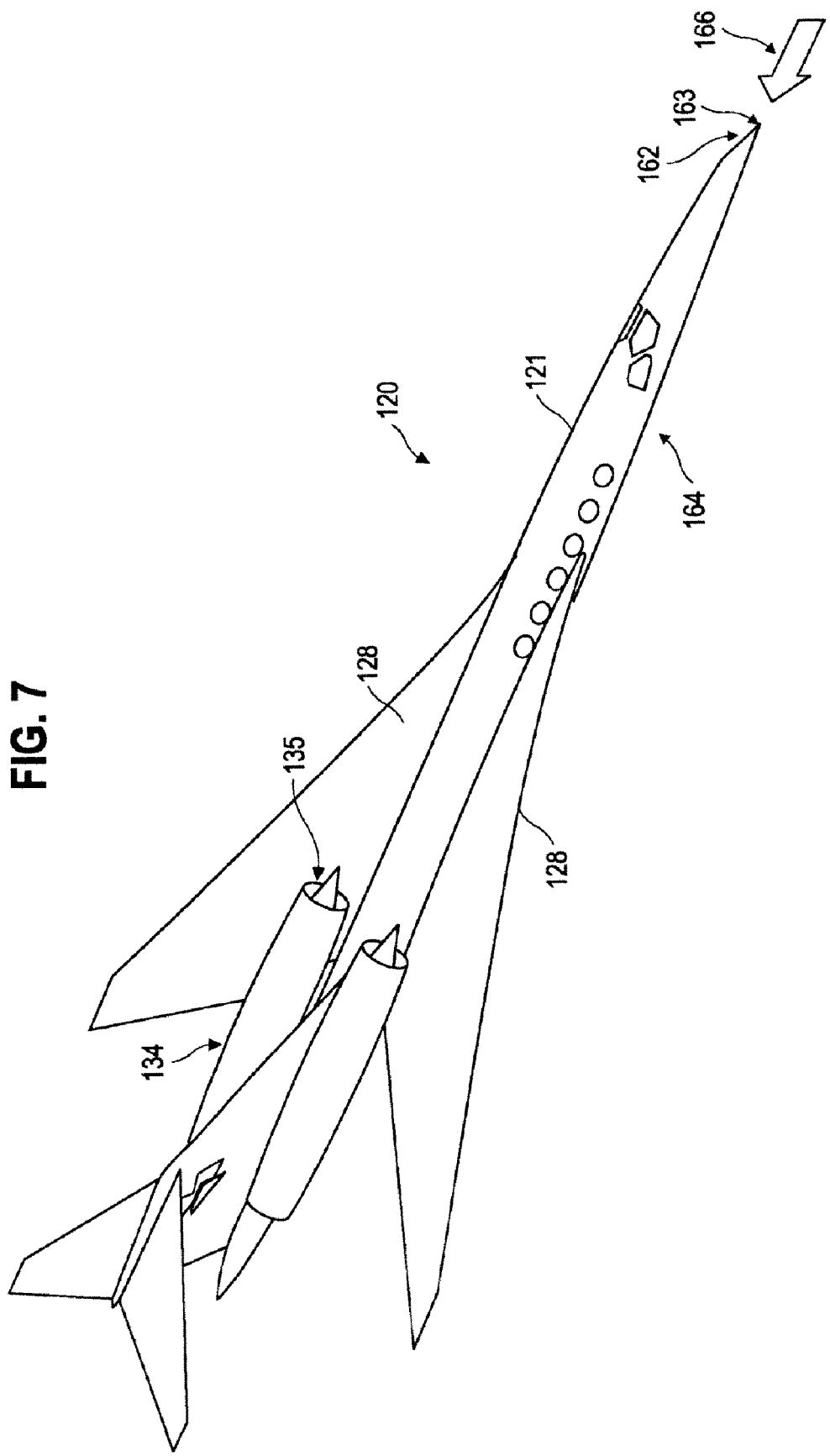

SUPERSONIC AIRCRAFT FOR REDUCING SONIC BOOM EFFECTS AT GROUND LEVEL

CROSS-REFERENCE TO RELATED APPLICATIONS

The present application is a continuation of U.S. application Ser. No. 11/307,280 filed 30 Jan. 2006, now abandoned, which is a divisional of U.S. application Ser. No. 10/708,404 filed 1 Mar. 2004, now abandoned, which is a continuation-in-part application of PCT/US03/02631 filed 30 Jan. 2003 and a continuation-in-part application of U.S. application Ser. No. 10/104,403 filed 22 Mar. 2002, now U.S. Pat. No. 6,698,684, each of which are continuation-in-part applications of U.S. application Ser. No. 10/060,656 filed 30 Jan. 2002, and now abandoned. Said applications are hereby expressly incorporated by reference into the present application in their entireties for purposes of disclosure.

TECHNICAL FIELD

The invention relates generally to supersonic aircraft fuselage design. More particularly, it relates to aircraft accessory designs for controlling the magnitude of pressure disturbances or waves generated by an aircraft flying at supersonic speed so as to reduce sonic boom effects at ground level.

BACKGROUND ART

In flight, an aircraft produces pressure waves or disturbances in the air through which it is flying. These pressure waves propagate at the speed of sound. When the aircraft flies at subsonic speed, these pressure waves propagate in all directions around the aircraft, including ahead of the aircraft. When aircraft fly at supersonic speed, these pressure waves cannot propagate ahead of the aircraft because the aircraft is traveling faster than the propagation speed of the waves. Instead, the pressure waves generated by the aircraft typically coalesce into two shock waves, one associated with the nose of the aircraft and the other associated with the tail of the aircraft. These shock waves pressure differentials that propagate circumferentially away from the aircraft. With respect to the shock wave associated with the nose (the "bow shock"), the pressure increases abruptly from about ambient to a pressure significantly thereabove. The pressure decreases down from this pressure significantly above ambient down to a pressure below ambient in the region between the bow shock and the shock wave associated with the tail (the "tail shock"). The pressure then increases abruptly from below ambient to about ambient at the tail shock.

These shock waves can propagate great distances away from the aircraft and eventually those that are directed downwardly will reach the ground where they can produce significant acoustic disturbances called sonic booms. Sonic booms are so named because of the sounds created by the abrupt pressure changes when the shock waves pass a reference point on the ground. The acoustic signature of a sonic boom is commonly characterized as an N-wave because the pressure changes associated with the acoustic signature resemble the letter "N" when plotted as a function of position from the nose of the aircraft. That is, an N-wave is characterized by the abrupt pressure rise associated with the bow shock, commonly referred to as "peak overpressure," followed by a decrease to a pressure below ambient. This is followed by the abrupt rise back toward ambient pressure in association with the tail shock. Where perceivable, typically on the ground by a person, a sonic boom effect is caused by the two rapid-succession, high magnitude pressure changes. Strong sonic booms cause an objectionably loud noise, as well as other undesirable conditions at ground level. For these reasons, supersonic flight over some populated areas is restricted. A schematic representation of the phenomenon of aircraft produced sonic boom is provided in FIG. 20.

It should be appreciated that shock waves propagate in the form of a "Mach Cone" having a shape defined by a Mach angle ($\mu$). The Mach angle $\mu$ is a function of the Mach number M, which is defined as the ratio of the speed of an object over the speed of sound. The Mach angle ($\mu$) can be determined using the equation:

$$\sin(\mu) = 1/M, \text{ or}$$

$$\mu = \sin^{-1}(1/M)$$

The shape of the Mach cone produced by an aircraft in supersonic flight can be represented by rotating a line drawn from the aircraft's nose tip toward the tail of the aircraft and oriented at an angle ($\mu$) with respect to the aircraft's direction of travel. Consequently, the tip of the Mach cone points in the direction of travel.

In order for supersonic flight over land to be acceptable, the pressure disturbances that cause the sonic boom's acoustic signature must be controlled to avoid strong sonic boom effects caused by the abrupt pressure changes due to the bow and tail shock waves.

It should be appreciated that it is not only the magnitude of the created pressures that are radiated to ground level from an aircraft flying at supersonic speeds that causes persons to experience unpleasant sonic boom effects, but it is primarily the rate(s) of change in the pressures experienced at ground level (pressure differentials–$\Delta$ P) that produces the undesirable sonic boom effects. Therefore, one goal for minimizing audible sonic boom effects is to control pressure differentials caused at ground level by a supersonic flying craft.

Another characteristic of the pressure waves or disturbances generated by a supersonic flying aircraft is that the elevated pressures associated essentially with the forward portion of the craft have an effect that coalesces together as they travel toward the ground. As FIG. 20 depicts, the lowered pressures associated essentially with the rearward portion of the craft also have an effect that coalesces together as they travel toward the ground. As described above, it is these two primary pressure changes that cause the sonic boom effects at ground level. Therefore, it can be a solution to the sonic boom problem to smooth the pressure differentials so that there are no abrupt changes. That is to say, the magnitude of the different pressures induced by a supersonic flying aircraft need not necessarily be altered, but it can be enough for some aircraft designs to smooth the abrupt pressure changes experienced at ground level to be more gradual.

Features of the aircraft that cause such abrupt changes in the induced pressures are also detrimental. As explained hereinabove, the pressure disturbances or waves radiate from the aircraft at a relationship based at least in part on the speed of the craft. The angle of radiation can also be affected by the magnitude of the caused disturbance. That is to say, and is best illustrated in FIG. 21, abrupt projections off of the fuselage of the aircraft (transverse to the direction of travel of the aircraft) will cause larger and higher angle disturbances than smooth transitions. In the case of FIG. 21, the outwardly projecting jet engines cause pressure waves; one at the top, forward projecting portion of the inlet, and another at the lower lip of the engine's inlet. The pressure disturbances induced by the engine of the aircraft in FIG. 21 coalesce and thereby detrimentally create a combined pressure differential at the ground. Therefore, working toward the goal of minimizing differentials in the pressure profile or signature of a supersonic aircraft, a design challenge has been identified to keep transverse projections (to the direction of travel of the aircraft), and even surface disruptions to a minimum. In this context, a surface disruption is considered to be any dimensional change along the length of the aircraft that is transverse to the axis of travel. Since it is pressure waves radiating from the bottom of the plane that most effects ground boom, it is to the extreme lower surfaces of the aircraft that this smoothing goal is most relevant.

As background to the present invention(s), it is known that attempts have been made to modify the design of supersonic aircraft in order to adjust the sonic boom signature. These modifications have included changes to wing design, as described in U.S. Pat. No. 5,934,607, issued to Rising, et al., for a "Shock Suppression Supersonic Aircraft." Another approach involves incorporating air passages through the fuselage or wings of supersonic aircraft, such as the structures described in U.S. Pat. No. 4,114,836, issued to Graham, et al., for an "Airplane Configuration Design for the Simultaneous Reduction of Drag and Sonic Boom"; U.S. Pat. No. 3,794,274, issued to Eknes, for an "Aircraft Structure to Reduce Sonic Boom Intensity"; and U.S. Pat. No. 3,776,489, issued to Wen, et al., for a "Sonic Boom Eliminator." Further attempts at reducing the sonic boom caused by supersonic aircraft include the addition to the aircraft of structure arranged to disrupt the air flow patterns as the aircraft travels at supersonic speed. Examples include the structure described in U.S. Pat. No. 3,709,446, issued to Espy, for a "Sonic Boom Reduction" and U.S. Pat. No. 3,647,160, issued to Alperin, for a "Method and Apparatus for Reducing Sonic Booms."

Another attempt to control the sonic boom in a supersonic aircraft uses a blunt nose to increase the air pressure immediately adjacent to the nose of the aircraft, thus disrupting the normal formation of the pressure wave that causes the acoustic signature. This disruption results in a reduction of the abruptness of the pressure changes that develop after the initial pressure rise in the acoustic wave that strikes the ground. A blunt nose, however, does not reduce the initial overpressure rise in the resulting boom signature. Furthermore, a blunt nose creates a significant amount of drag on the aircraft, drastically decreasing its efficiency.

U.S. Pat. No. 5,740,984, issued to Morgenstern, for a "Low Sonic Boom Shock Control/Alleviation Surfaces" describes a mechanical device on the nose of the airplane which can be moved between a first position effecting a blunt nose when sonic boom reduction is desired and a second position effecting a streamlined nose when sonic boom reduction is not required, thereby removing (in the streamlined configuration) the drag penalty inherent in a blunt nose design.

U.S. Pat. Nos. 5,358,156, 5,676,333, and 5,251,846, all issued to Rethorst and all entitled "Supersonic Aircraft Shock Wave Energy Recovery System" (collectively "the Rethorst patents"), describe an aircraft with a modified wing design and a forward ring on the fuselage for eliminating the sonic boom of a supersonic aircraft. FIG. 19 in each of the Rethorst patents shows a side elevation view of an aircraft whose nose coincides with the bottom of its fuselage. It appears from FIGS. 19A and 19B that the bottom of at least a portion of the fuselage is planar. The Rethorst patents do not provide further disclosure regarding this fuselage shape, and they do not teach non-uniform propagation of pressure disturbances about the fuselage. To the contrary, the Rethorst patents teach that the initial bow shock is axisymmetric about the nose. See U.S. Pat. No. 5,676,333 at col. 14, lines 31-34; U.S. Pat. No. 5,738,156 at col. 14, lines 6-10; and U.S. Pat. No. 5,251,846 at col. 14, lines 9-12.

Regarding another aspect of the present invention, the same being the inclusion of a leading and/or trailing spike on the supersonic aircraft, the Rethorst patents also describe a supersonic aircraft having a spike extending from the front of the aircraft and a forward ring on the fuselage for eliminating a sonic boom. The spike is described to direct the bow shock onto the manifold ring that recovers the shock energy and converts it to useful work. The spike is further depicted as being extendable, but it does not include a complex surface contour, and it is not disclosed to include a number of (plurality) telescopically collapsible sections. Instead, the Rethorst spike is disclosed as being a single cylindrical member that tapers to a point at a leading end.

U.S. Pat. No. 4,650,139, issued to Taylor et al., discloses a blunt-nosed spike that can be extended from a space vehicle's fuselage.

U.S. Pat. No. 3,643,901, issued to Patapis, discloses a ducted spike for attachment to a blunt body operating at supersonic speed for the purpose of receiving and diffusing oncoming air to reduce pressure drag on, and erosion of the blunt body.

U.S. Pat. No. 3,425,650, issued to Silva, discloses an apparatus that can be extended on a boom from the front of an aircraft to deflect air outwardly therefrom.

U.S. Pat. No. 3,655,147, issued to Preuss, covers a device attached to the lower forebody of an aircraft for the purpose of reflecting pressure disturbances caused by the aircraft's flight in directions away from the ground.

Although some of the foregoing documents are directed to sonic boom mitigation, none of them address the sonic boom signature shaping techniques of the present invention.

DISCLOSURE OF INVENTION

In one embodiment, the invention takes the form of a method for configuring and operating an aircraft for minimizing sonic boom effects at ground level during supersonic flight of the aircraft. The method includes configuring the aircraft so that in flight, with landing gear retracted, a lower profile of the aircraft is substantially linear. In a related embodiment, the profile is slightly concave downward. In either embodiment, a nose portion of the aircraft is arranged so that an apex thereof is coincident with the lower profile of the aircraft. The aircraft is flown at supersonic speed and oriented during supersonic flight so that the substantially linear lower profile of the aircraft is oriented substantially parallel to onset or local airflow. Multiple different-magnitude pressure disturbances are generated below the aircraft, and waves thereof are radiated below the aircraft toward the ground. These disturbances below the aircraft are of lesser magnitude than pressure disturbances simultaneously generated and radiated above the aircraft. The different-magnitude pressure disturbances generated below the aircraft are controlled so that differentials thereamong are sufficiently minimized that ground level sonic boom effects are minimized during supersonic flight.

The present invention may be alternatively characterized as a method for configuring and operating an aircraft for minimizing sonic boom effects at ground level during supersonic flight that include configuring the aircraft so that an apex of a nose portion of the aircraft is coincident with a lower profile of the aircraft, and when flying the aircraft at supersonic speed, a majority of a plurality of generated different-magnitude pressure disturbances, and especially the strongest of the generated pressures, are diverted above the aircraft thereby establishing an asymmetrical distribution of the different-magnitude pressure disturbances about the aircraft. A minority of the plurality of different-magnitude pressure disturbances that are diverted below the aircraft, and which advantageously constitute the weaker of the disturbances, are controlled so that ground level sonic boom effects are minimized during supersonic flight.

In a further sense, the present invention(s) relate to aircraft fuselage configurations that cause the shock waves created by an aircraft in supersonic flight to propagate non-uniformly about the aircraft such that the portions of the shock waves that propagate toward the ground are of lesser intensity than the corresponding portions of the shock waves produced by an aircraft having a conventional fuselage design. The amplitude of the sonic boom experienced at the ground is thereby reduced.

A conventional supersonic aircraft includes a generally cylindrical fuselage whose nose comes to a point generally about the fuselage's longitudinal axis. When such an aircraft flies at supersonic speed, it generates shock waves that propagate generally symmetrically in all radial directions about the fuselage.

In the preferred embodiment of the present invention, an aircraft includes a fuselage whose nose coincides with the bottom of the fuselage. When an aircraft embodying this design flies at supersonic speed, it creates an asymmetrical pressure distribution. The shock waves resulting from normal supersonic flight propagate toward the ground with lesser intensity than in other directions. Detailed computational fluid dynamics (CFD) calculations and propagation analyses have shown that a supersonic aircraft embodying the invention produces a characteristically weaker acoustic signature at the ground than a conventional supersonic aircraft. Thus, the invention provides an important ingredient for shaping the sonic boom signature to permit supersonic flight over land.

In another aspect, the present invention provides an additional improvement in aircraft design that is directed to mitigating the effects of sonic booms at ground level. An aircraft according to the present invention includes a spike that extends from the aircraft's nose in a direction substantially parallel to the aircraft's length to effectively lengthen the aircraft. A longer aircraft generally is expected to produce a sonic boom of lesser amplitude at ground level than a shorter aircraft of similar weight because the pressure disturbance is distributed over a greater length. Therefore, a sonic boom created by an aircraft accordingly configured will be of lesser intensity than a sonic boom created by a conventionally designed supersonic aircraft having similar characteristics.

The spike can include several sections of varying cross-sectional area. The foremost, or farthest upstream section of the spike preferably has a cross-sectional area that is characteristically small compared to that of the aircraft's full fuselage or fuselage forebody. Generally, subsequent (farther aft) downstream sections of the spike progressively increase in cross-sectional area. It is, however contemplated, that a particular downstream section can have a smaller cross-sectional area than one or more upstream sections.

Transitions between sections of the spike preferably occur through curved or generally conical transition surfaces. However, other transition region contours are possible, as well. The foremost portion of the spike preferably tapers to a relatively sharp tip at its leading end, as well as through curved, conical, or other shaped transitional regions.

In preferred embodiments, the spike can be retracted into the fuselage when sonic boom mitigation is not needed or desired. For example, it may be desirable to retract the spike into the fuselage when the aircraft is flying at subsonic speeds, or is on the ground (to facilitate taxiing and parking).

The spike can be a single member, however it preferably includes two or more sections that can be collapsed telescopically to facilitate retraction of the spike into the fuselage. Such a telescoping feature also facilitates adjustment of the spike's overall length and the relative position of the transitions between multiple sections of varying cross-sectional area. For example, in the illustrated and exemplary embodiment, the spike includes a substantially cylindrical center section (which is the foremost section of the spike when the spike is fully or partially extended) surrounded by one or more overlapping, collapsible, annular sections. In other embodiments, the several sections can have other regular or irregular cross-sectional shapes. In such alternate embodiments, the spike can be a single member or it can be configured as two or more collapsible sections in a manner similar to that described above.

When an aircraft embodying such a spike is flown at supersonic speed, the tip of the spike causes an initial shock wave to be formed. Because at least the foremost portion of the spike's cross-section is characteristically smaller than that of the full fuselage or fuselage forebody, this induced initial shock is of substantially weaker strength than the initial shock that would be generated by an otherwise unadapted fuselage or fuselage forebody of an otherwise similar aircraft not having a spike. Further weak shocks are caused by the cross-sectional area transitions between adjacent telescoping sections (or similar discontinuities in a one-piece spike's contour), as discussed above.

The position and shape of the foregoing transition regions define the strength and position of the weak shock waves created thereby. The position and shape of these transition regions are selected to reduce coalescence of the weak shocks into a strong sonic boom at the ground. The optimum position and shape of these transition regions are functions of several variables and can be expected to vary from aircraft to aircraft, based on the particular aircraft's overall configuration. For example, the optimum position and shape of the transition regions may depend on the aircraft's overall length, weight, fineness ratio, wing placement, engine placement, empennage design and the like. In some embodiments of this aspect of the present invention, the position of such transition regions relative to each other and/or the aircraft's fuselage can be adjusted on demand by incrementally extending or retracting particular sections of the spike.

A spike according to the present invention can be used in connection with conventional fuselage designs. It also can be used in connection with other fuselage designs, for example, but without limitation, a fuselage configuration in which the nose of the fuselage lies on a line substantially defining the bottom of the fuselage; a characteristic that also described herein as an aspect or characteristic of a supersonic aircraft configured in conformance with the teachings of the present invention(s). As described herein, when an aircraft embodying this shaped fuselage design flies at supersonic speed, it creates an asymmetrical pressure distribution. The shock waves created by such an aircraft during normal supersonic flight propagate toward the ground with lesser intensity than in other directions. Detailed computational fluid dynamics (CFD) calculations and propagation analyses have shown that such an aircraft can be expected to produce a characteristically weaker acoustic signature at the ground than conventional aircraft. Thus, the foregoing fuselage shaping technique provides an important ingredient for shaping the sonic boom signature to permit supersonic flight over land. In alternate embodiments, at least the forward portion of the spike itself can be shaped in a manner similar to the novel fuselage discussed above. A spike embodying such a configuration causes the portions of the shock waves that propagate toward the ground to be of lesser intensity than the corresponding portions of the shock waves produced by an axisymmetric spike.

Similar benefits can be realized from the placement of a spike as described above at the rear of a supersonic aircraft. Accordingly, the present invention can be embodied as an aircraft having a spike projecting from the aft fuselage or empennage closure thereof in addition to or instead of the forward-projecting spike described above.

In any event, the several aspects and disclosed embodiments of the present invention(s) that are described hereinabove, are not to be treated as limiting, but instead as examples of ways that the invention(s) can be implemented, as well as claimed for protection as recited in the attached claims.

BRIEF DESCRIPTION OF THE DRAWINGS

FIG. 7 is a perspective view of an aircraft having an asymmetric fuselage, at least with respect to horizontal, and configured according to the present invention;

MODE FOR INVENTION

The propagation characteristics of shock waves created by supersonic aircraft can be analyzed using, for example, CFD analysis methods. These analyses can be complicated because an aircraft includes many components (for example, a fuselage, wings, engines, tailfin, etc.) that contribute to such disturbances. However, such analyses commonly are simplified by modeling the aircraft as a semi-infinite body of revolution. Analyses indicate that shock waves propagate substantially uniformly about supersonic aircraft modeled in this manner.

Figure 3A:
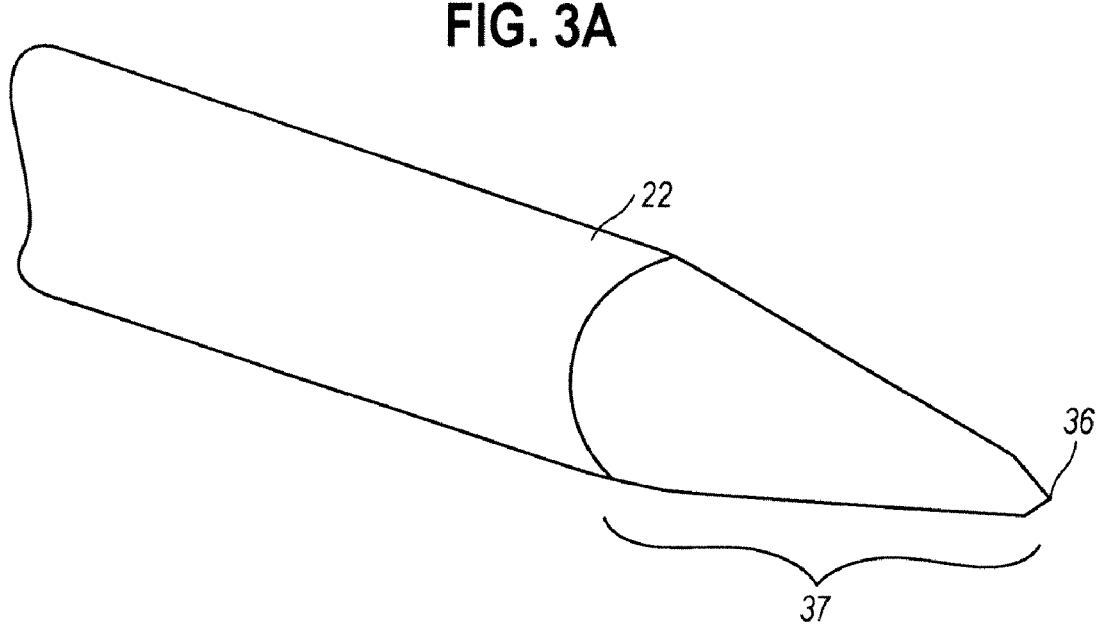
FIG. 3A is a perspective view of an aircraft represented as an equivalent body of revolution, including the effects of lift and volume.
Figure 3B:
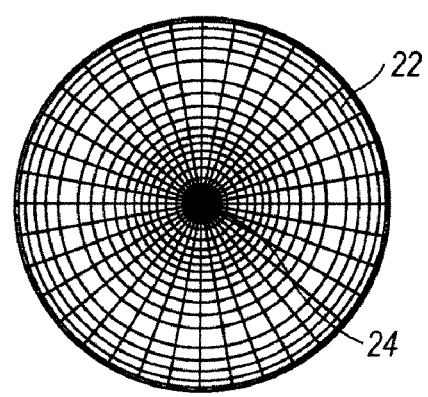
FIG. 3B is a front elevation view of an aircraft represented as an equivalent body of revolution, showing the transition from a substantially cylindrical cross-section to a point.

FIGS. 3A and 3B provide perspective and front elevation views, respectively, of an aircraft represented as a semi-infinite equivalent body of revolution 22, with the front of the aircraft corresponding to point 36 on the equivalent body of revolution. Equivalent body of revolution 22 models the atmospheric disturbance caused by the flight of the aircraft it represents. More particularly, equivalent body of revolution 22 models the atmospheric disturbance caused by the displacement of atmospheric medium by the volume of the aircraft and by the lift generated by the aircraft. Portion 37 of equivalent body of revolution 22 represents the disturbance caused by such volume and lift, while the remainder of equivalent body of revolution 22 represents the disturbance caused by lift only. As such, portion 37 of equivalent body of revolution 22 corresponds to the length of the aircraft represented thereby, while the remainder of equivalent body of revolution 22 corresponds to the wake thereof. As is most clearly illustrated in FIG. 3B, each cross-section of equivalent body of revolution 22 is substantially circular, and the center of each such circular cross-section lies on a common centerline 24.

Figure 4:
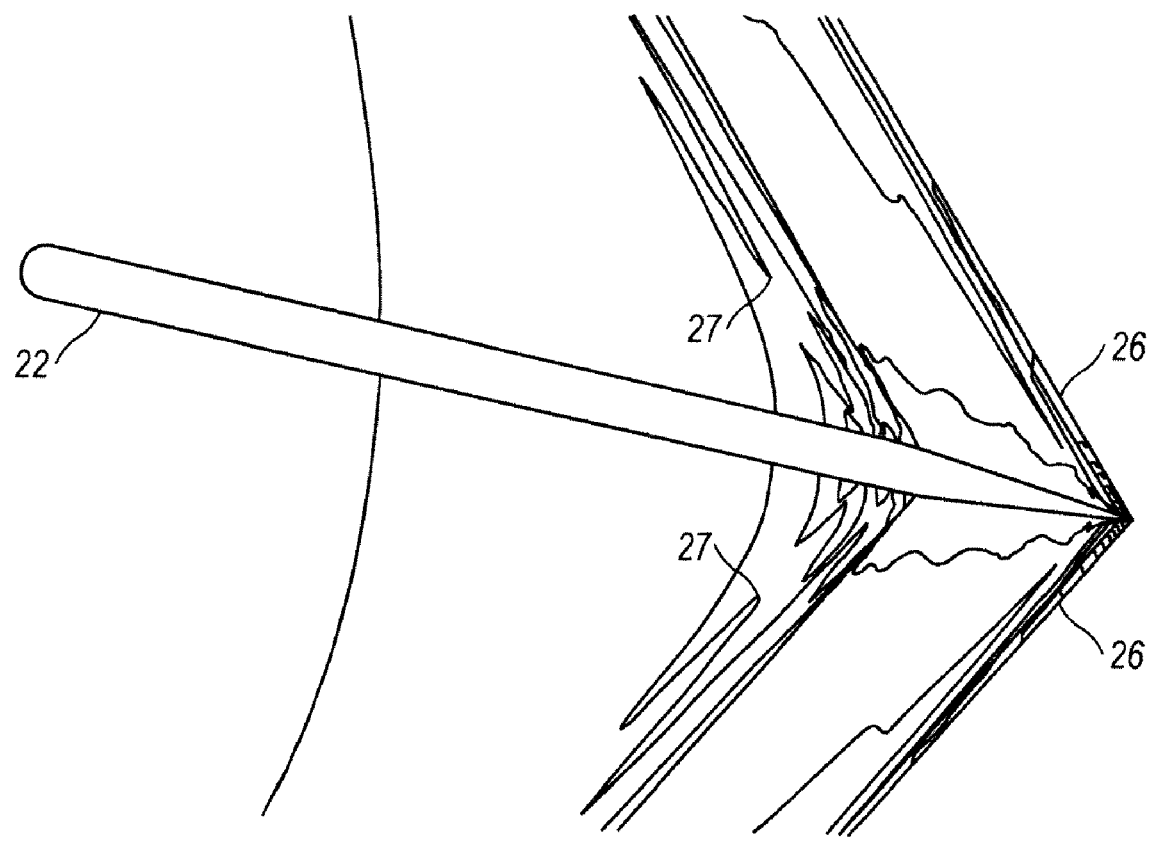
FIG. 4 illustrates the near-field pressure contour produced by an aircraft represented as an equivalent body of revolution flying at supersonic speed.
Figure 5:
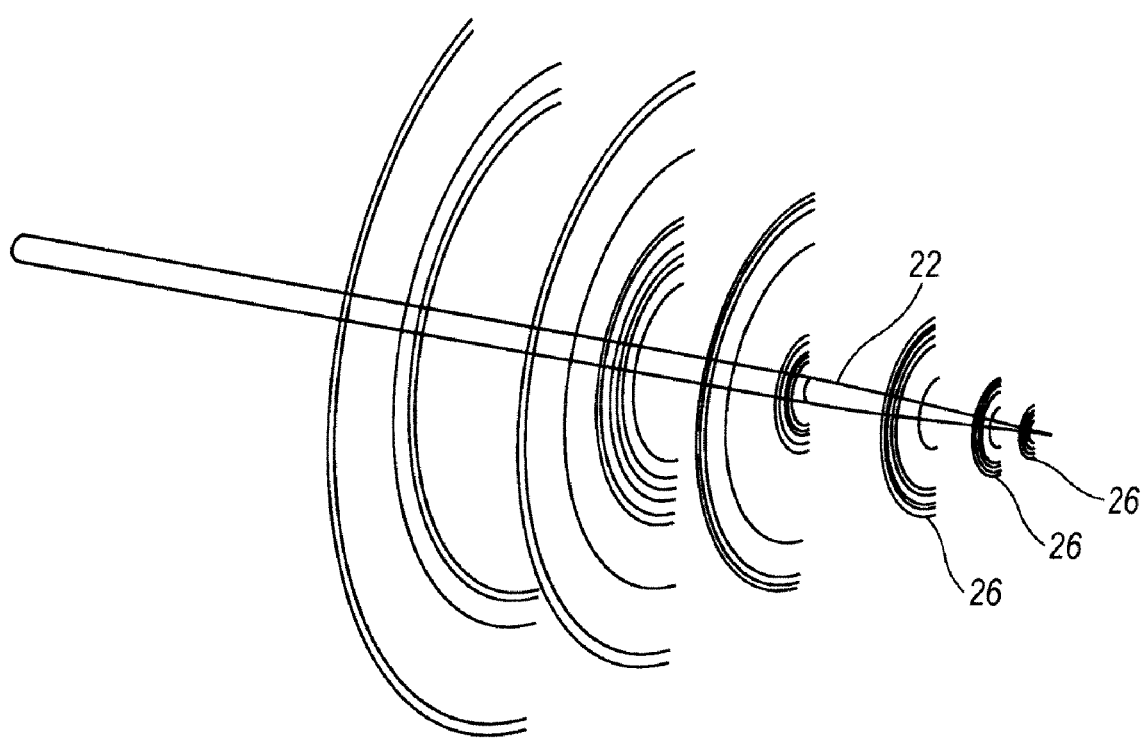
FIG. 5 illustrates the propagation of the pressure disturbance produced by an aircraft represented as an equivalent body of revolution flying at supersonic speed.

FIG. 4 illustrates a computer model of the near-field pressure disturbance that would be created by an aircraft represented as equivalent body of revolution 22 flying at supersonic speed. This pressure disturbance is characterized by bow shock 26 which propagates substantially uniformly, i.e., axisymmetrically, about equivalent body of revolution 22 and, thus, the aircraft it represents. Bow shock 26 propagates in the shape of a Mach cone, as described above. As shown in FIG. 5, bow shock 26 remains axisymmetric about equivalent body of revolution 22 as bow shock 26 propagates far away from the aircraft; the tail shock 27 behaves similarly as shown.

Figure 6A:
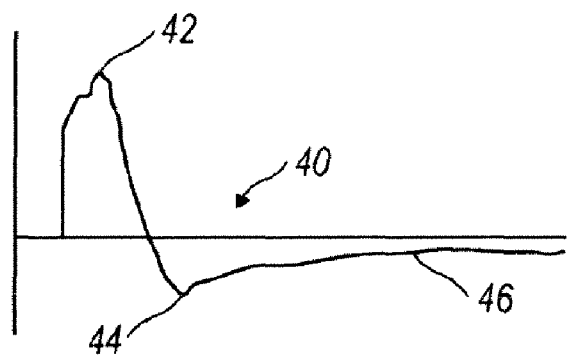
FIG. 6A is a plot of the near-field pressure disturbance caused by an aircraft represented as an equivalent body of revolution traveling at supersonic speed.

FIG. 6A is a graph of the near-field pressure disturbance 40 (the pressure disturbance near the aircraft) caused by an aircraft represented as equivalent body of revolution 22 traveling at supersonic speed as a function of location relative to the aircraft. The x-axis units are $X°-°Y/\tan(\mu)$, where X represents the axial location of a point on the aircraft measured from the front of the aircraft, Y represents the perpendicular distance from the aircraft to the point where the disturbances are being modeled (here, Y is about equal to 2.5 times the length of the of the aircraft) and $\mu$ is the Mach angle, as explained above. The y-axis units are $\Delta P/P$, where P represents ambient pressure and $\Delta P$ represents the change in local pressure from ambient pressure.

The near-field pressure disturbance is characterized by a positive pressure spike 42 occurring at about the nose of an aircraft represented as equivalent body of revolution 22, followed by a sharp pressure reduction 44 between the nose and tail of such an aircraft to below ambient pressure, followed by a gradual return to ambient pressure 46 at about the tail of such an aircraft.

Figure 6B:
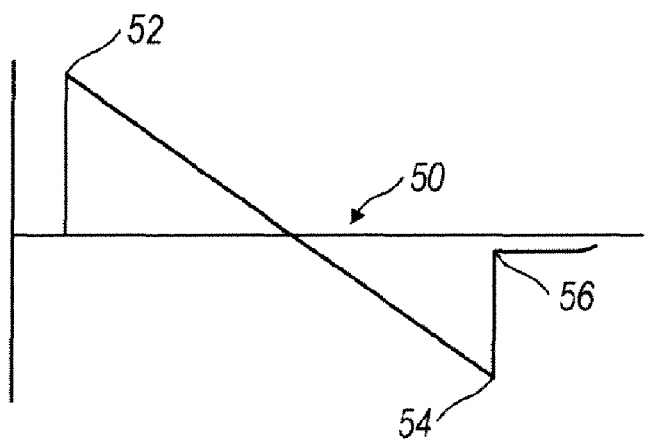
FIG. 6B is a schematic plot of the pressure disturbance at ground level caused by an aircraft represented as an equivalent body of revolution traveling at supersonic speed.

At greater distances Y from an aircraft represented by equivalent body of revolution 22, the individual pressure waves contributing to the near-field distribution illustrated in FIG. 6A coalesce to form a classic sonic boom acoustic signature, or N-wave, 50 as shown schematically in FIG. 6B, wherein the value of Y (i.e., the perpendicular distance from the aircraft to the point where the disturbance is being measured) is taken to be about 500 times the length of the aircraft. The acoustic signature 50 of an aircraft represented as equivalent body of revolution 22, shown schematically in FIG. 6B, is characterized by a positive pressure spike 52 corresponding to the bow shock passing a reference point (e.g., a point on the ground), followed by a linear pressure decrease to sub-ambient pressure 54, followed by a second positive pressure spike 56 corresponding to the tail shock passing the reference point, returning the pressure to ambient pressure.

Figure 1:
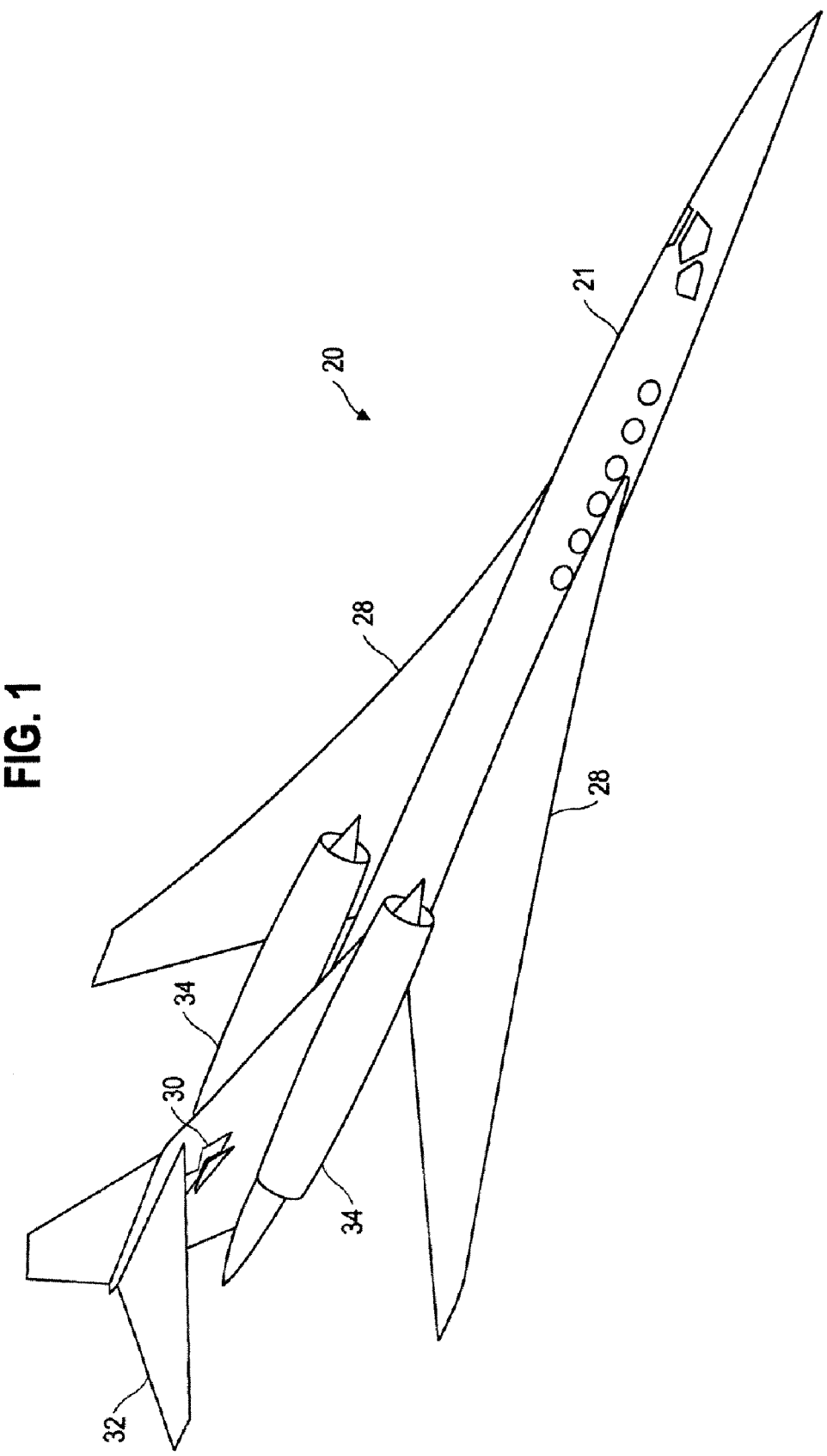
FIG. 1 is a perspective view of an aircraft having an axisymmetric fuselage.
Figure 2A:
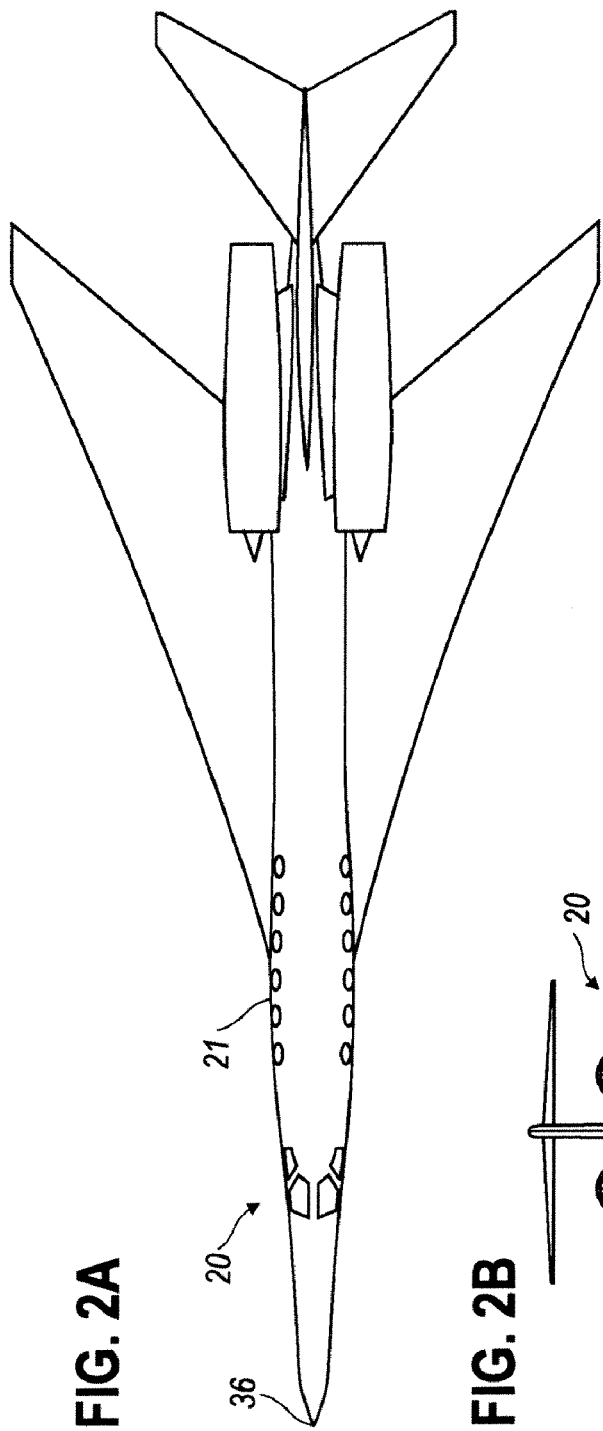
FIG. 2A is a top plan view of the aircraft illustrated in FIG. 1.
Figure 2B:
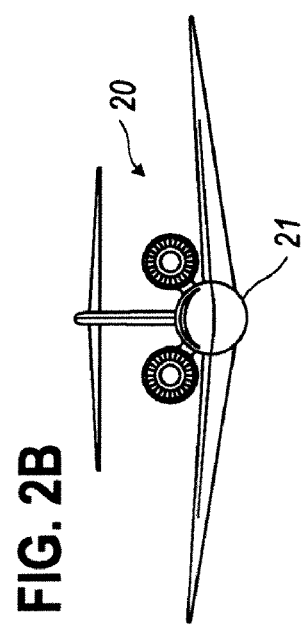
FIG. 2B is a front elevation view of the aircraft illustrated in FIG. 1.
Figure 2C:
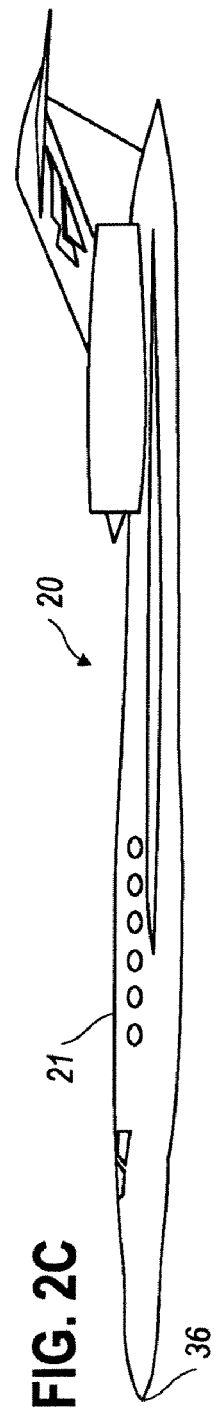
FIG. 2C is a side elevation view of the aircraft illustrated in FIG. 1.

FIG. 1 provides a perspective view of a conventional aircraft 20, which can be readily represented by equivalent body of revolution 22, as shown in FIGS. 3A and 3B. Aircraft 20 includes wings 28 and engines 34 attached to a substantially axisymmetric fuselage 21. Aircraft 20 further includes horizontal stabilizer 32 and tailfin 30, both of which in turn are attached to fuselage 21. FIGS. 2A-2C provide top plan, front elevation, and side elevation views, respectively, of conventional aircraft 20.

Figure 9A:
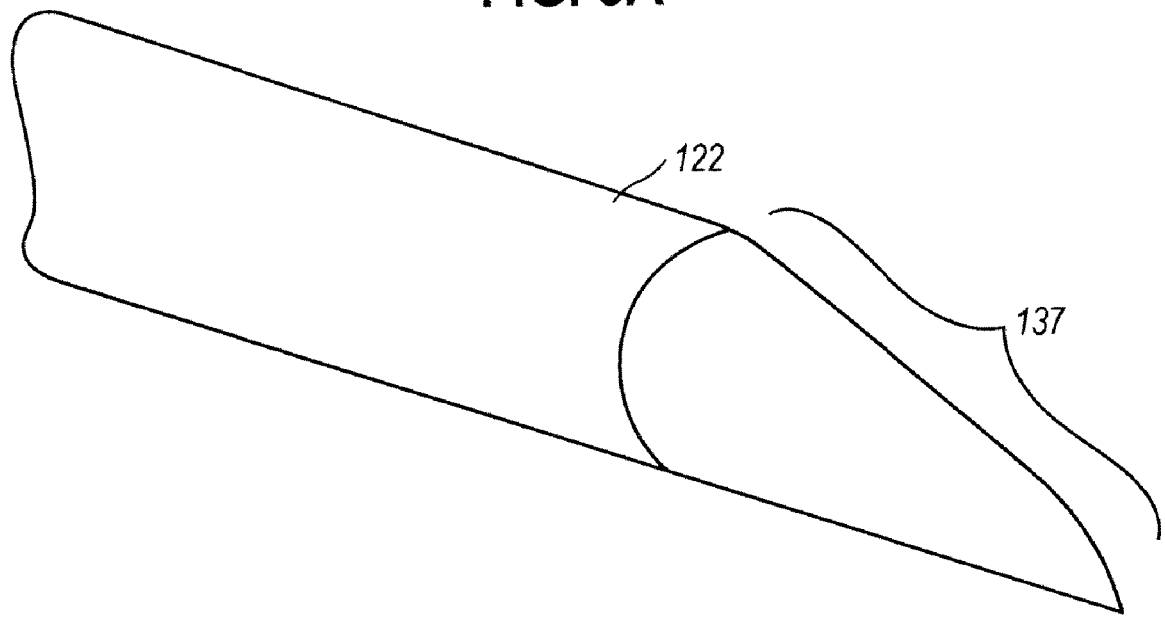
FIG. 9A is a perspective view of an aircraft represented as an equivalent asymmetric body according to the present invention, including the effects of lift and volume.
Figure 9B:
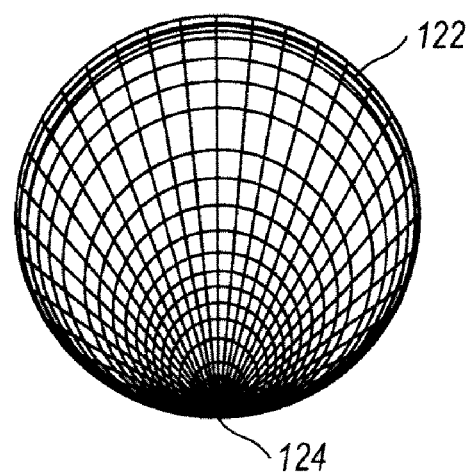
FIG. 9B is a front elevation view of an aircraft represented as an equivalent asymmetric body according to the present invention, showing the transition from a substantially cylindrical cross-section to a point aligned with the bottom of the body.

FIGS. 9A and 9B illustrate perspective and front elevation views of an aircraft configured according to the present invention that is represented as equivalent body 122. Equivalent body 122 models the atmospheric disturbance caused by the flight of aircraft according to the present invention. More particularly, equivalent body 122 models the atmospheric disturbance caused by the displacement of atmospheric medium by the volume of an aircraft according to the present invention and by the lift generated by such an aircraft. Portion 137 of equivalent body 122 represents the disturbance caused by such volume and lift, while the remainder of equivalent body 122 represents the disturbance caused by lift only. As such, portion 137 of equivalent body 122 corresponds to the length of the aircraft represented thereby, while the remainder of equivalent body 122 corresponds to the wake thereof.

It can be seen from FIGS. 9A and 9B that equivalent body 122 is not a body of revolution, but is instead asymmetric. These figures, particularly FIG. 9B, further show that each cross-section of equivalent body 122 may be substantially circular in the preferred embodiment. However, whereas the centers of each cross-section of equivalent body of revolution 22 illustrated in, for example, FIGS. 3A and 3B, lie on a common centerline 24, the same is not true of the cross-sections of equivalent body 122. Instead, the bottom of substantially each and every circular cross-section of equivalent body 122 lies substantially on a common line 124. As will be discussed further below, the bottom of at least a substantial portion of the cross-sections comprising at least the forward portion of an aircraft fuselage according to the present invention; i.e., an aircraft represented by equivalent body 122, lie on a common line.

Figure 10:
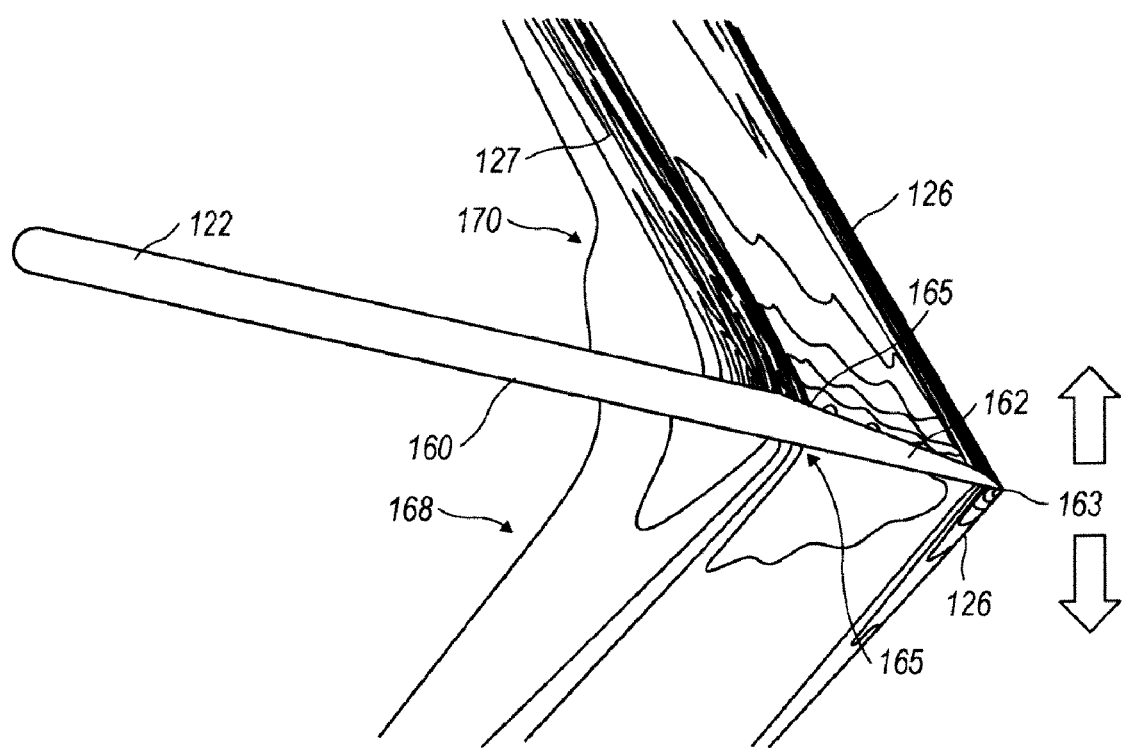
FIG. 10 illustrates the near-field pressure contour produced by an aircraft represented as an equivalent asymmetric body according to the present invention flying at supersonic speed.
Figure 11:
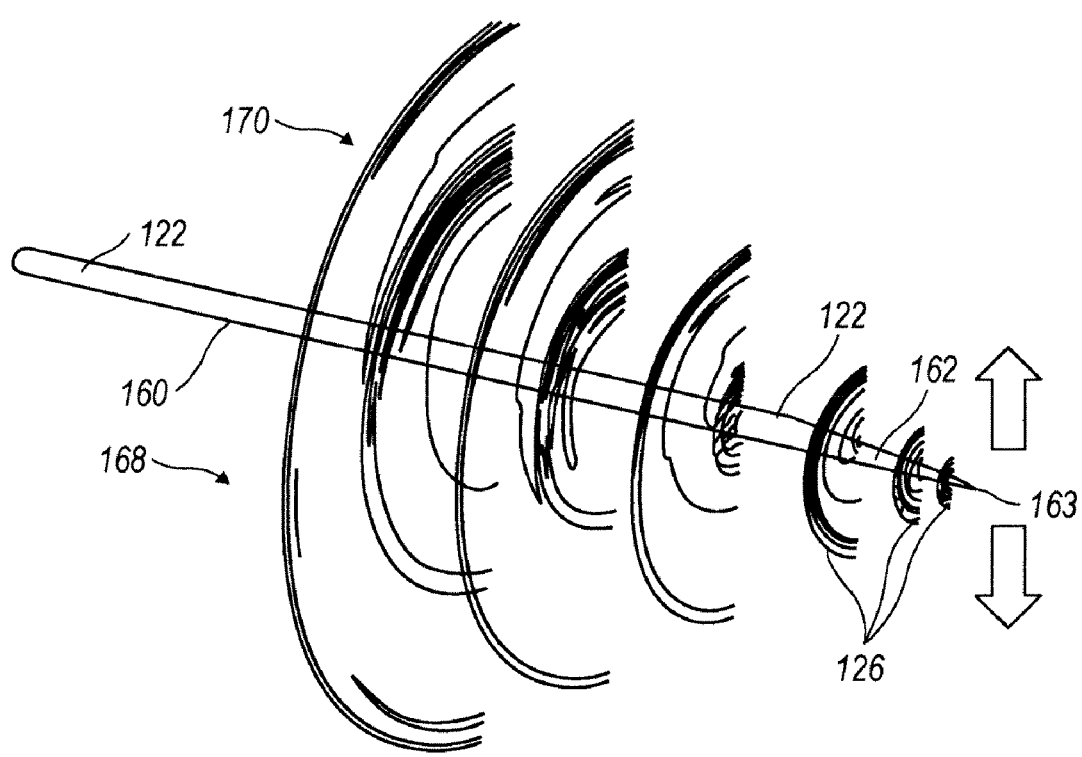
FIG. 11 illustrates the propagation of a pressure disturbance produced by an aircraft represented as an equivalent asymmetric body flying at supersonic speed.

FIG. 10 illustrates a computer model of the near-field pressure disturbance that would be created by an aircraft represented by equivalent body 122 flying at supersonic speed. Like the near-field pressure disturbance caused by equivalent body of revolution 22, illustrated in FIG. 4, these pressure disturbances are characterized by bow shock 126 that propagates about equivalent body 122 in the shape of a Mach cone and tail shock 127 as shown. However, the pressure disturbance caused by equivalent body 122 is markedly different from the pressure disturbance caused by equivalent body of revolution 22 in that the pressure contour associated with the disturbance caused by equivalent body 122 is much stronger above and to the sides thereof than beneath it. That is, the pressure contour associated with this disturbance is asymmetric. Further, the pressure contour beneath equivalent body 122 is much less dense than the pressure contour beneath equivalent body of revolution 22, representing a conventional aircraft of similar size, under similar flight conditions. As shown in FIG. 11, the pressure contour resulting from bow shock 126 remains asymmetric about equivalent body 122 as bow shock 126 propagates away from equivalent body 122.

Figure 12A:
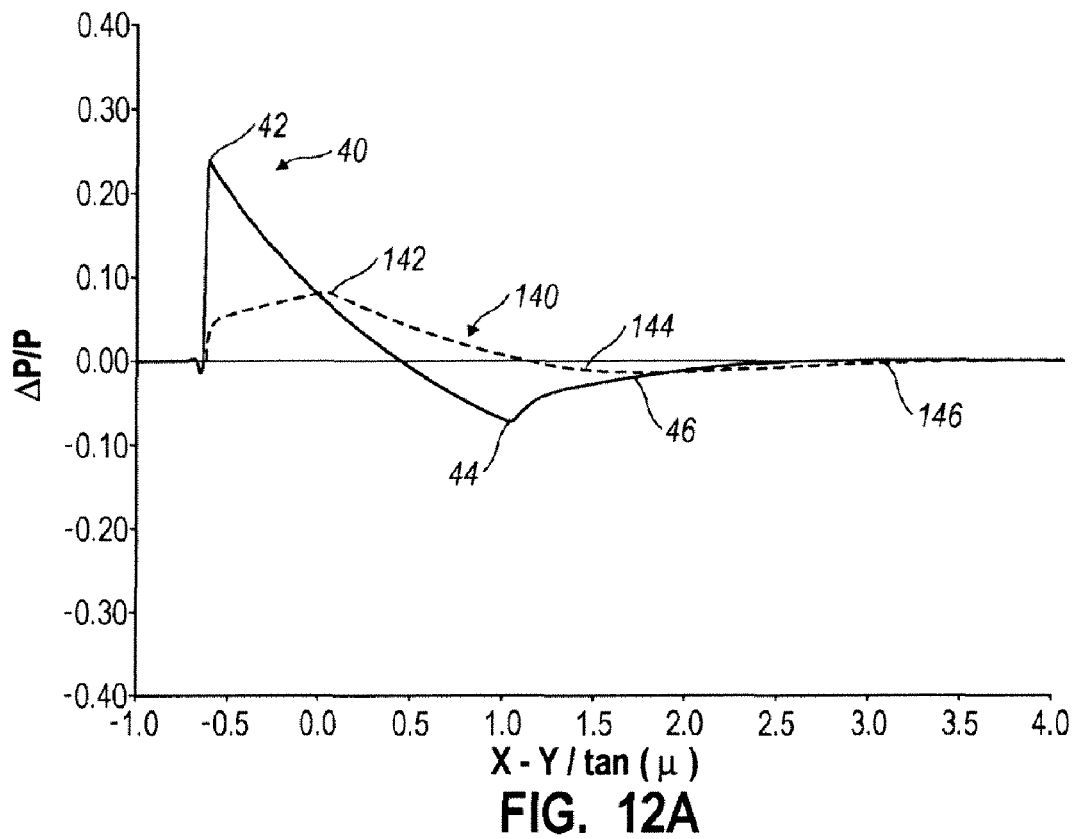
FIG. 12A is a schematic plot of the near-field pressure disturbance caused by an aircraft represented as an equivalent asymmetric body according to the present invention traveling at supersonic speed (dashed line), superimposed on a plot of the near-field pressure disturbance caused by a conventionally designed aircraft represented as an equivalent body of revolution traveling at supersonic speed (solid line)

FIG. 12A provides a graph of the near-field (here, Y is about equal to 2.5 times the aircraft length) pressure disturbance 140 caused by an aircraft represented by equivalent body 122 traveling at supersonic speed, superimposed on the graph of the near-field pressure disturbance 40 caused by an aircraft represented by equivalent body of revolution 22 traveling at supersonic speed, as illustrated in FIG. 6A. The peak pressure rise 142 resulting from supersonic flight of an aircraft represented by equivalent body 122 is of substantially lesser magnitude than the peak pressure rise 42 caused by an aircraft represented by equivalent body of revolution 22 under similar flight conditions. Similarly, the pressure drop 144 to below ambient associated with an aircraft represented by equivalent body 122 is of substantially lesser magnitude than pressure drop 44 to below ambient caused by an aircraft represented by equivalent body of revolution 22 under similar flight conditions. Likewise, the pressure return 146 to ambient associated with an aircraft represented by equivalent body 122 is of lesser magnitude than pressure return 46 to ambient caused by an aircraft of similar size represented by equivalent body of revolution 22, under similar flight conditions.

Figure 12B:
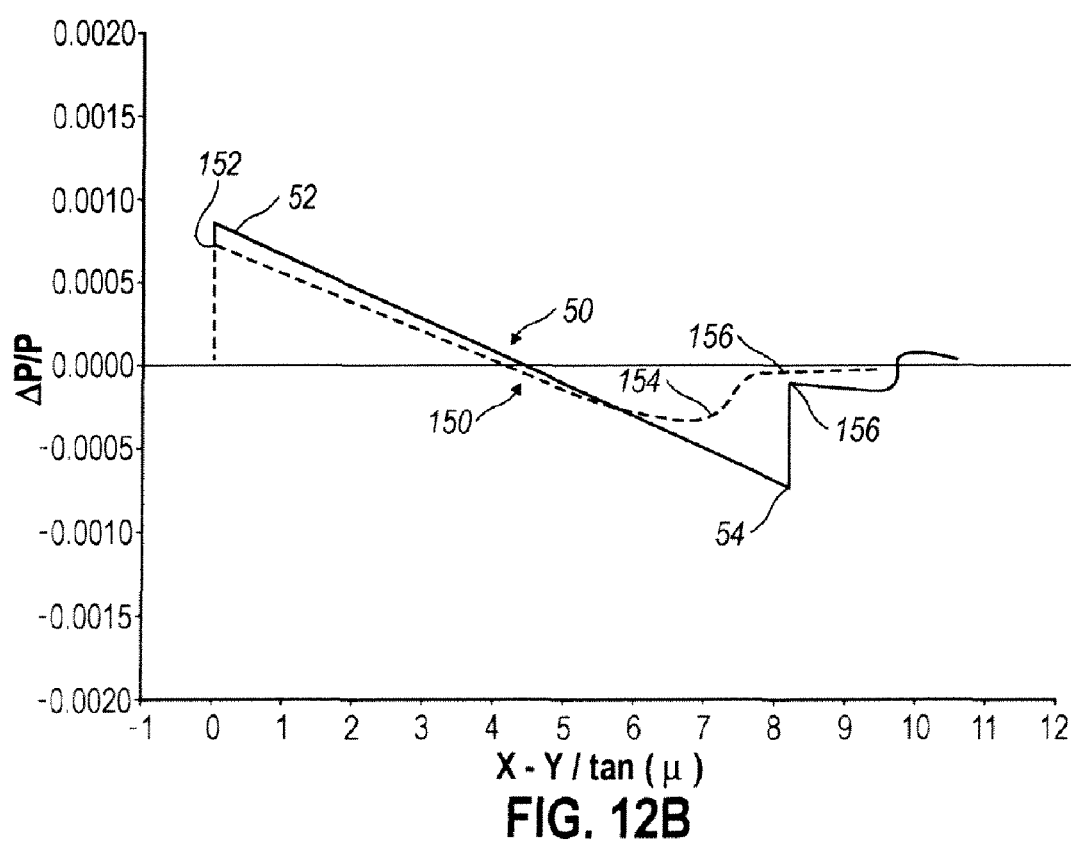
FIG. 12B is a plot of the pressure disturbance at ground level caused by an aircraft represented as an equivalent asymmetric body according to the present invention traveling at supersonic speed (dashed line), superimposed on a plot of the pressure disturbance at ground level caused by an aircraft represented as an equivalent body of revolution traveling at supersonic speed (solid line).

FIG. 12B provides a graph of the far-field (here, Y is about equal to 500 times the aircraft length) pressure disturbance 150 caused by an aircraft according to the present invention represented by equivalent body 122 traveling at supersonic speed, superimposed on the graph of the far-field pressure disturbance 50 caused by an aircraft represented by equivalent body of revolution 22 traveling at supersonic speed, as illustrated in FIG. 6A. The peak pressure rise 152 resulting from supersonic flight of an aircraft represented by equivalent body 122 is of substantially lesser magnitude than the peak pressure rise 52 caused by an aircraft of similar size represented by equivalent body of revolution 22, under similar flight conditions. Similarly, the pressure drop to below ambient 154 associated with an aircraft represented by equivalent body 122 is of substantially lesser magnitude than pressure drop 54 to below ambient caused by an aircraft represented by equivalent body of revolution 22 under similar flight conditions. Likewise, the pressure return to ambient 156 associated with an aircraft represented by equivalent body 122 is of substantially lesser magnitude than pressure return 56 to ambient caused by an aircraft represented by equivalent body of revolution 22 under similar flight conditions.

CFD analysis thus shows that the pressure disturbance above an aircraft configured according to the present invention represented by equivalent body 122 is significantly greater than the pressure disturbance below such an aircraft. Relatively strong disturbances, shown as tightly packed contour lines in FIGS. 10 and 11, propagate upward, away from the ground. Substantially weaker disturbances, shown as loosely packed contour lines in FIGS. 10 and 11, propagate towards the ground. Further, the ground-directed disturbances produced by an aircraft represented by equivalent body 122 are substantially weaker than the ground-directed disturbances produced by an aircraft represented by equivalent body of revolution 22. Thus, the ground-directed disturbances produced by an aircraft represented by equivalent body 122 according to the present invention are expected to result in significantly weaker sonic booms compared to those produced by an aircraft represented by equivalent body of revolution 22.

Figure 8A:
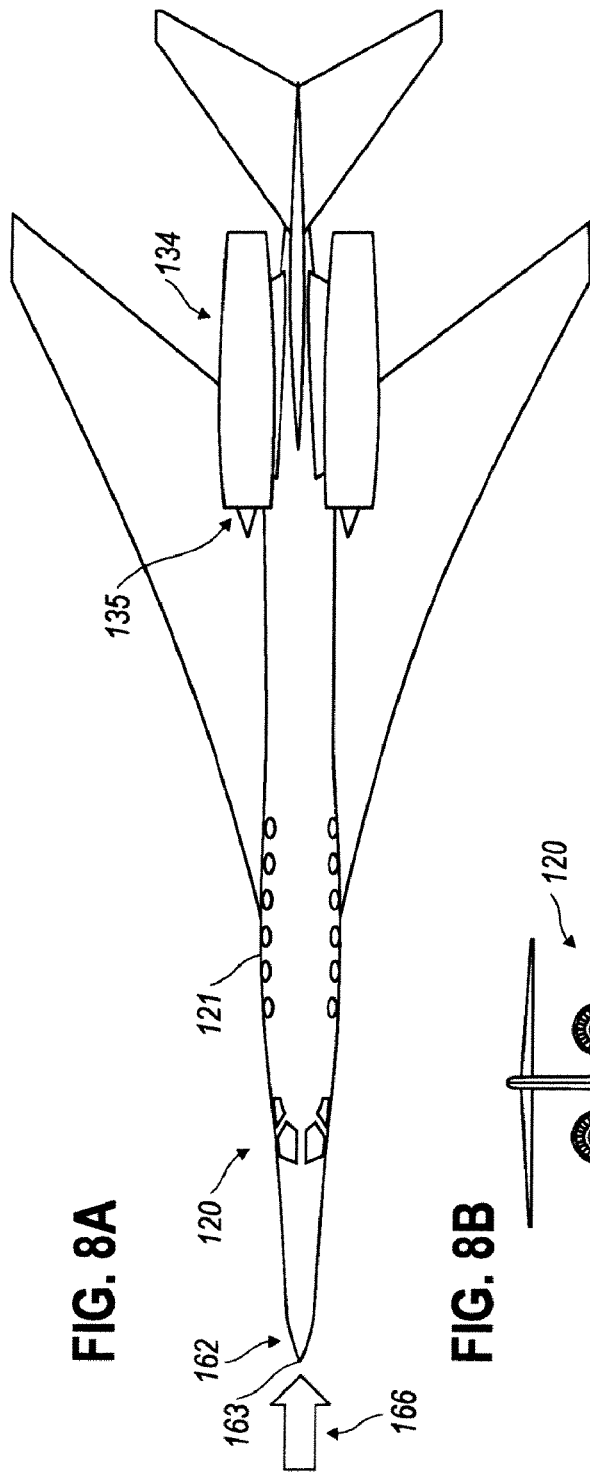
FIG. 8A is a top plan view of the aircraft illustrated in FIG. 7.
Figure 8B:
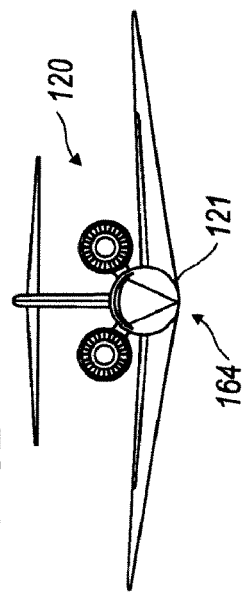
FIG. 8B is a front elevation view of the aircraft illustrated in FIG. 7.
Figure 8C:
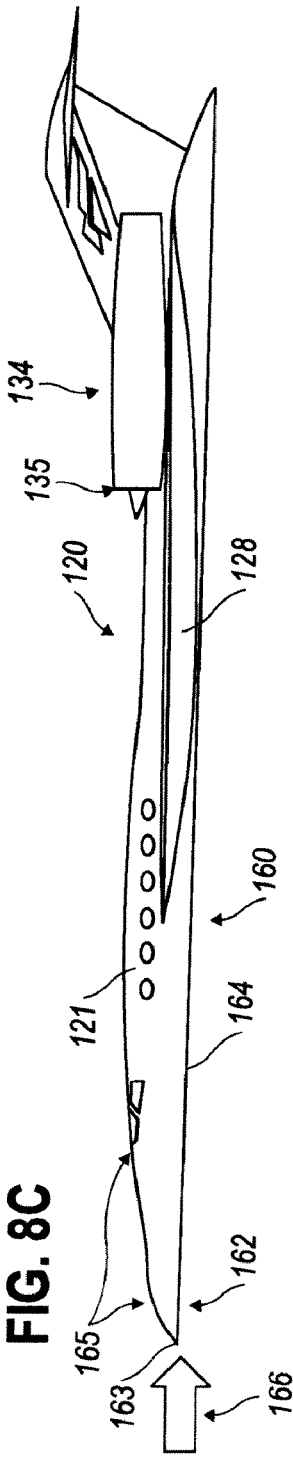
FIG. 8C is a side elevation view of the aircraft illustrated in FIG. 7.

FIG. 7 illustrates a perspective view of a supersonic aircraft 120 having a novel fuselage design according to a preferred embodiment of the present invention. FIGS. 8A-8C illustrate top plan, front elevation, and side elevation views of aircraft 120, respectively. The foregoing figures illustrate a preferred embodiment of the invention wherein the bottom of substantially every cross-section of fuselage 121 lies substantially on a line located at the intersection of the bottom of fuselage 121 with a plane tangent to the bottom of fuselage 121, as described above. In certain alternate embodiments, many of the benefits of the foregoing fuselage design can be realized even if the bottom of some cross-sections of fuselage 121 do not lie on such a line. For example, in one alternate embodiment (not shown), fuselage 121 is asymmetric at its nose, but axisymmetric at its tail. In this embodiment, the bow shock experienced at ground level is of lesser magnitude than the bow shock resulting from supersonic flight of an aircraft having an axisymmetric nose. Other alternate embodiments may include discontinuities in the configuration of the fuselage bottom such that some cross-sections of the fuselage do not include a point that lies on a line formed by the intersection of the bottom of the fuselage and a plane tangent thereto. In fact, physical limitations associated with aircraft construction may preclude a configuration wherein the bottom of each and every fuselage cross-section lies on such a line, although such a configuration is within the scope of the present invention.

Further, although fuselage 121 is shown in FIGS. 7 and 8A-8C as having substantially circular cross-sections, fuselage 121 could have different cross-sectional shapes (or combinations of cross-sectional shapes) in other embodiments. Examples of such other cross-sectional shapes include, without limitation, non-circular curved shapes, partially circular shapes, partially non-circular curved shapes, and angled shapes (e.g., a "V" shape). Further, a fuselage according to the present invention can include more than one of the foregoing (or other) cross-sectional shapes along its length.

In a preferred embodiment, the invention takes the form of a method for configuring and operating an aircraft for minimizing sonic boom effects 172 at ground level during supersonic flight of the aircraft. One example of such a preferred embodiment is shown in the perspective views of FIGS. 7 and 13 where an airplane 120 is shown flying at supersonic speed without creating a conventional sonic boom at ground level. This minimization of sonic boom signature is attributable at least in part to the fact that the craft is configured, so that in flight, and with landing gear retracted, the presented lower profile 160 of the aircraft 120 is substantially linear in configuration. To this end, a nose portion 162 of the fuselage 121 of the aircraft 120 is arranged so that an apex 163 thereof is coincident with the lower profile 160 of the aircraft. Exemplarily, it is the lower exterior surface 164 of the fuselage 121 of the aircraft 120 that establishes this substantially linear lower profile 160 of the aircraft 120.

Figure 13:
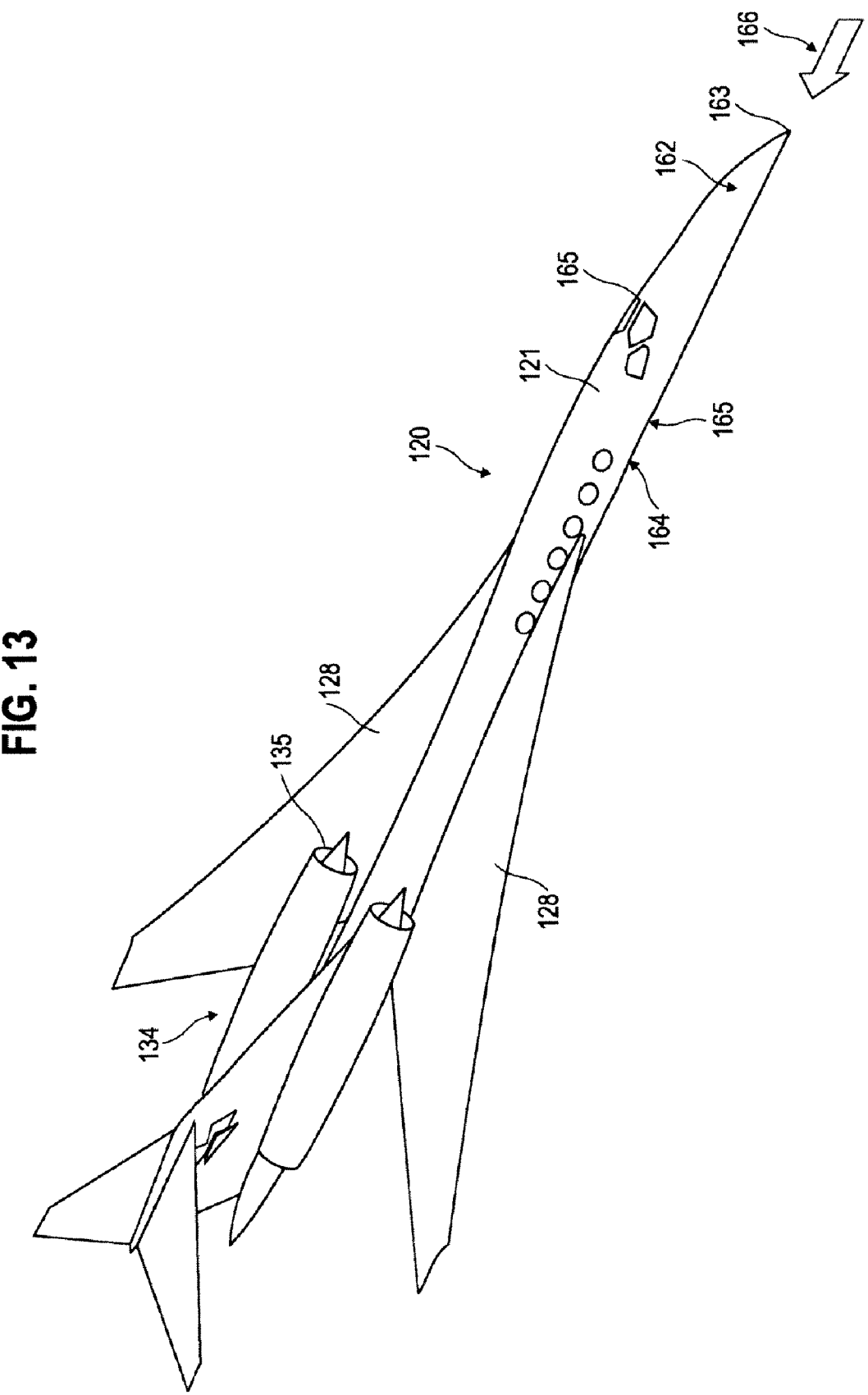
FIG. 13 is a perspective view of an alternative embodiment of the present invention in which the lower profile is substantially linear, but not absolutely linear.

This embodiment of the invention includes not only this structural configuration of the aircraft 120, but also flying the aircraft 120 at supersonic speed and orienting the aircraft 120 during such supersonic flight so that the lower profile 160 of the craft 120 is oriented substantially parallel to onset airflow 166. Onset flow 166 is illustrated in FIGS. 7 and 13, among others, by the arrow located ahead of the craft 120, and which is pointing toward the nose 163 of the craft 120. This onset flow 166 may be thought of as the relationship between the craft 120 and the air that is flowing thereover. In actually, however, it is the relative orientation of the airplane 120 as it pushes through the air. As explained herein, as such an aircraft 120 pushes through the air at supersonic speeds, pressure disturbances or waves are produced thereabout. As an aspect of the present invention, multiple, or as otherwise referred to, a plurality of different-magnitude pressure disturbances 168 are generated below the aircraft 120 and which then radiate therebelow. Conceptually, these pressure disturbances are illustrated in FIGS. 10 and 11. These aspects are graphically shown in FIGS. 12A, 12B, and 16-19 by dashed lines, and comparison is made in certain of these drawings to conventional characteristics of traditionally configured supersonic aircraft which are represented by solid line traces. These generated disturbances below the craft 120 are of lesser magnitude than a plurality of pressure disturbances 170 simultaneously generated above the aircraft 120 and radiating thereabove. An important feature of this embodiment of the invention is that the structural design of the craft 120 enables this plurality of different-magnitude pressure disturbances 168 generated below the aircraft to be controlled so that differentials thereamong (across the several pressure disturbances) are sufficiently minimized that ground level sonic boom effects are minimized during supersonic flight.

Throughout the description of the invention, certain aspects are characterized with the qualifier "substantially." For interpretation purposes, this terminology should be taken to denote the fact that moderate variations may be made from the so described configuration, orientation or relationship, but within limits that continue the prescribed effects associated with the so described aspect.

Figure 22:
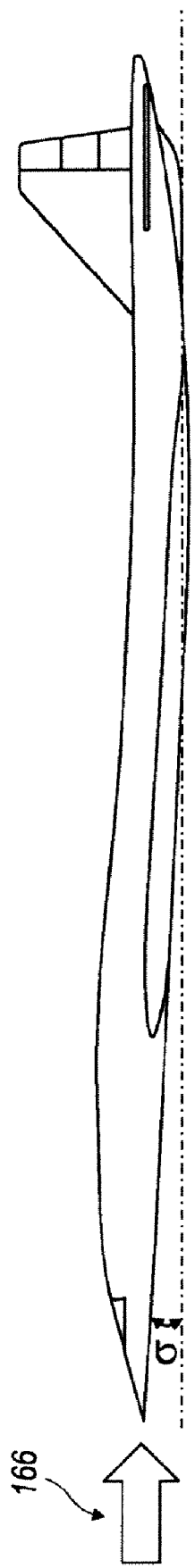
FIG. 22 is a pictorial of an exemplary aircraft flying at an inclined angle of attack.

An aspect of the above-described embodiment of the invention is that during supersonic flight, the aircraft 120 is preferably oriented so that its lower substantially linear profile is leveled to be substantially parallel with the direction of travel and onset airflow 166. This orientation is illustrated in at least FIG. 14, and can be compared to more traditional flying configurations such as that shown in FIG. 22 where a wing reference plane is shown flying with an inclined angle of attack. It should be appreciated that such an inclined angle of attack tends to accentuate downwardly directed pressure disturbances, as opposed to minimizing them as is the case in the more horizontal flying orientation of the present invention. Regarding illustrations in the associated drawings in which supersonic aircraft are shown relative to the ground, it should be appreciated that these FIGS. are not to scale, especially with respect to the perception of the elevations at which the aircraft are flying.

Figure 20:
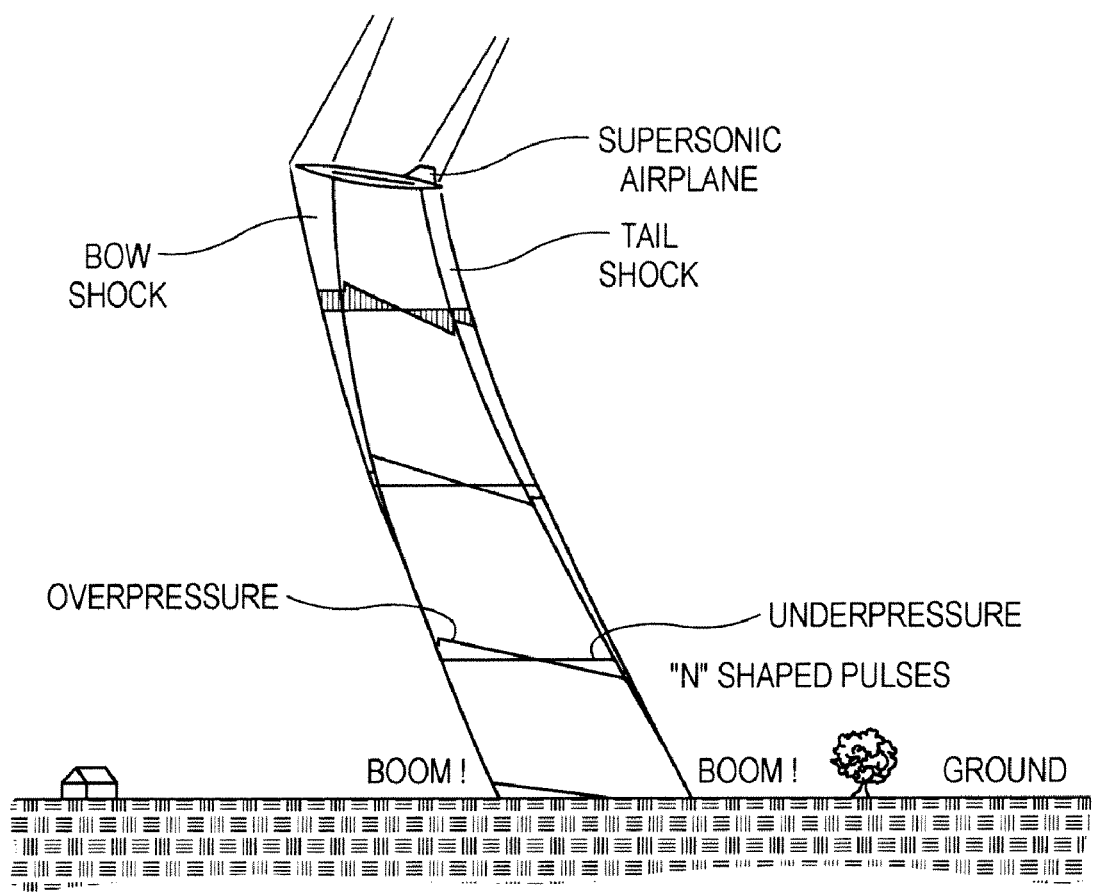
FIG. 20 is a schematic representation of the development of sonic boom by a conventionally designed sonic speed aircraft.
Figure 21:
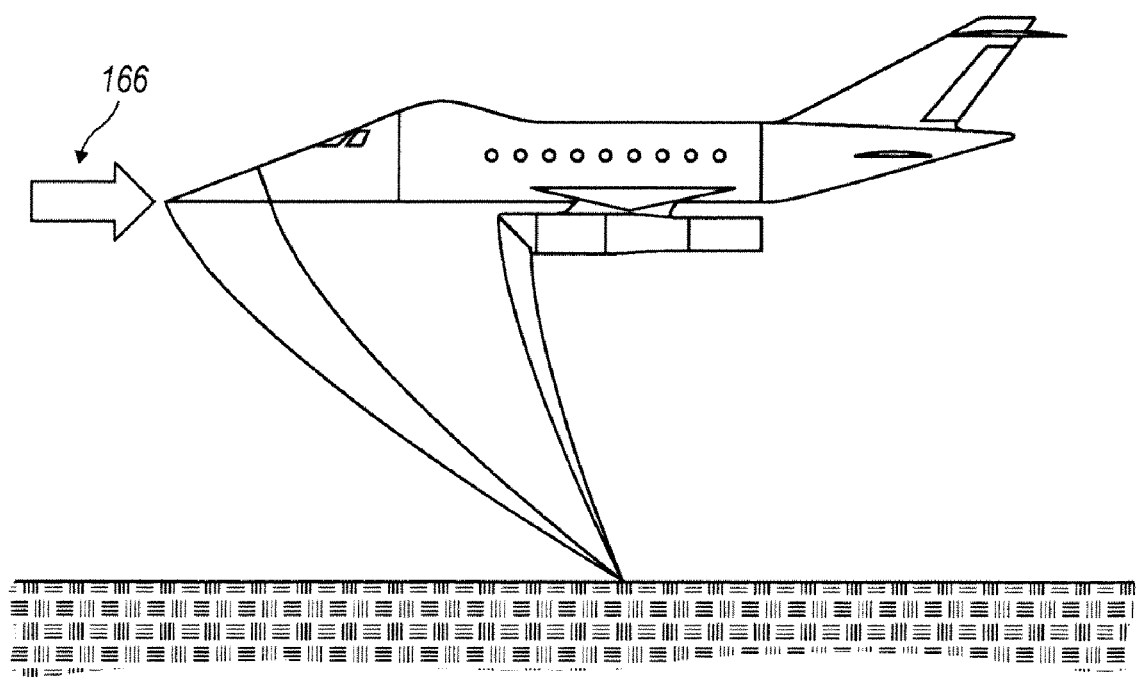
FIG. 21 is a pictorial of an exemplary aircraft in which a below-fuselage engine creates a disadvantageous pressure disturbance.

Another aspect of the invention is that the aircraft 120 is configured so that during supersonic flight coalescence of the different-magnitude pressure disturbances 168 is at least inhibited below the aircraft 120. This can be compared to traditional effects such as illustrated in FIG. 20 where bow shocks are shown to coalesce into a strong overpressure and the tail shocks are shown to coalesce into a drastic return toward ambient pressure. These coalescing effects contribute to the formation of traditional "N-wave" sonic boom signatures experienced at ground level below conventionally designed and flown supersonic aircraft.

Figure 14:
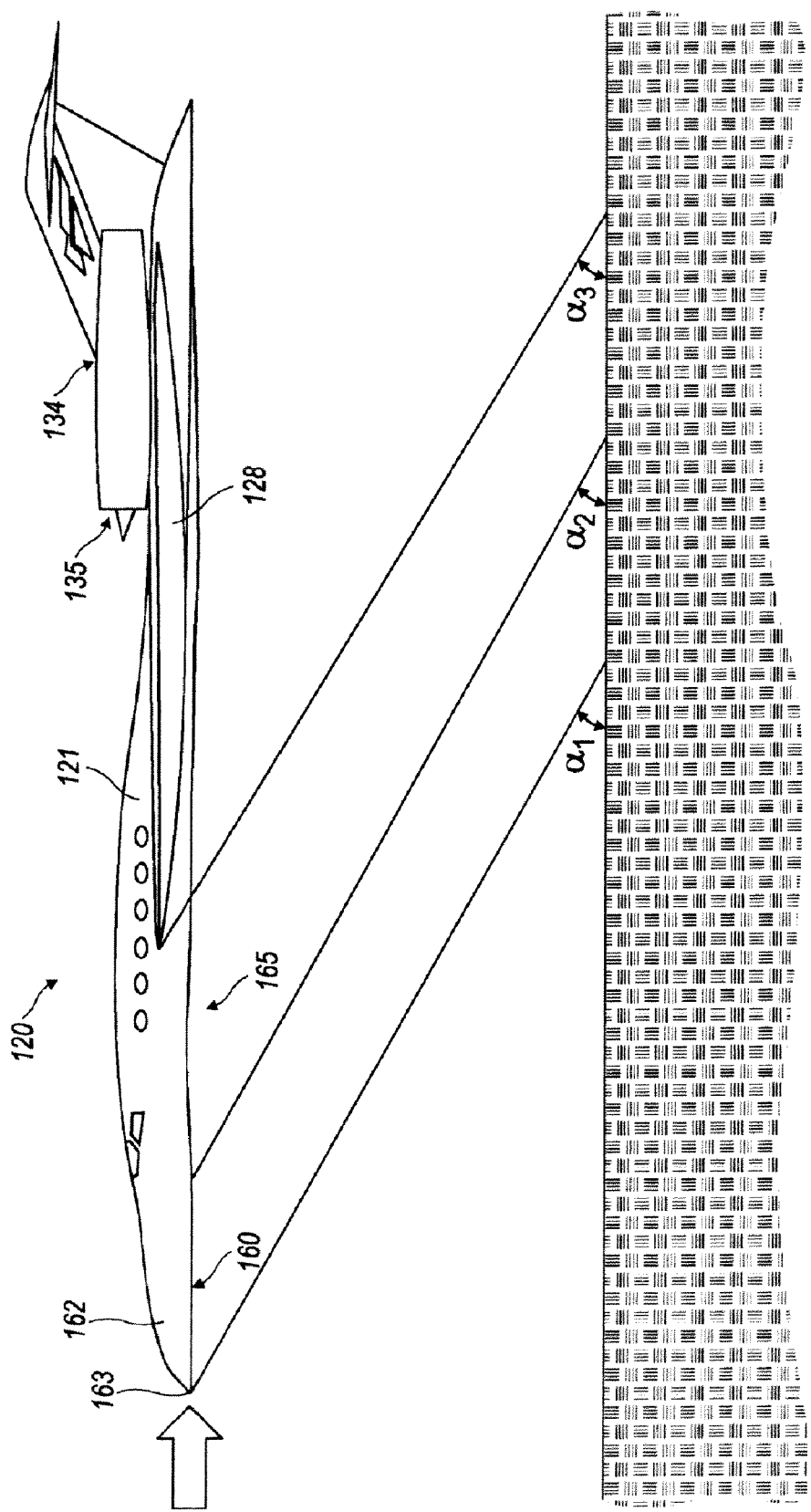
FIG. 14 is an elevational view of the aircraft of FIG. 13 shown relative to the ground and with the propagation of pressure disturbances depicted down to the ground where a sonic boom effect is minimized.

In a particularly preferred aspect of the invention, and as illustrated in at least FIG. 14, the lower profile 160 of the aircraft 120 is configured so that none of the stronger pressure disturbances generated below the aircraft and behind the disturbance caused by the forward nose 163 of the craft 120 propagate at angles sufficient to result in their coalescence prior to reaching ground level. This is schematically represented by the pressure lines stemming from features of the aircraft 120 behind the nose tip 163 in FIG. 14.

In the present context, the terminology of stronger pressure disturbances is used to identify those pressure disturbances of sufficient magnitude to have a potential for coalescing with disturbances in front or behind thereof, and thereby combining into a single, stronger disturbance instead of the previously distinct, weaker ones.

A preferred embodiment of the present invention also shapes the nose portion 162 of the aircraft 120 so that vertical cross-sections oriented perpendicular to a long axis of the aircraft are substantially round-shaped. Schematically, this is shown in FIG. 9B where a lower extremity of each circle 122 is coincident with the lower profile 160 (124) of the fuselage 121.

It is also contemplated that these vertical cross-sections can be substantially elliptical-shaped, with long axis being either substantially vertical or substantially horizontal.

In another aspect of the presently disclosed invention(s), the jet propulsion units 134 mounted upon the aircraft 120 are configured so that resulting pressure disturbances 168 created thereby and below the aircraft 120 are of lesser magnitude than any pressure disturbance caused by the apex 163 of the nose portion 162 below the aircraft 120. Still further, all inlets 135 of side-mounted jet propulsion units are positioned at above-wing locations thereby assuring that downwardly directed pressure disturbances 168 generated by the inlets 135 are substantially blocked from direct propagation below the substantially linear lower profile 160 of the aircraft 120.

A primary method of the presently disclosed invention for controlling the plurality of different-magnitude pressure disturbances 168 generated below the aircraft 120 is by selective arrangement of discontinuities 165 in a lower exterior surface of the aircraft and thereby assuring that ground level sonic boom effects are minimized during supersonic flight. Discontinuities should be understood to be established by slope changes across features of the aircraft 120 that establish the profile thereof.

Figure 15:
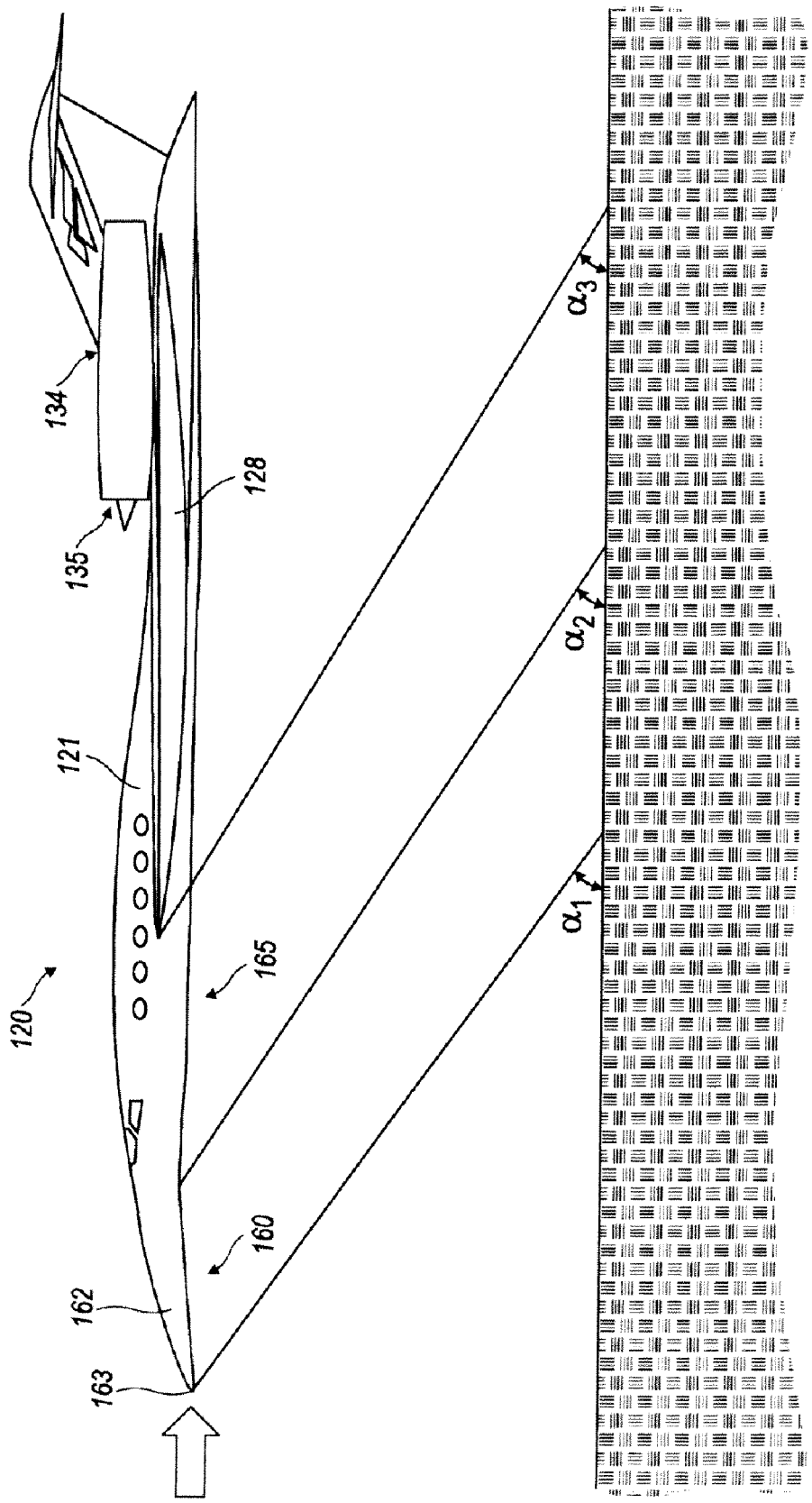
FIG. 15 is a perspective view of an alternative embodiment of the present invention in which the lower profile is downwardly concave.
Figure 16:
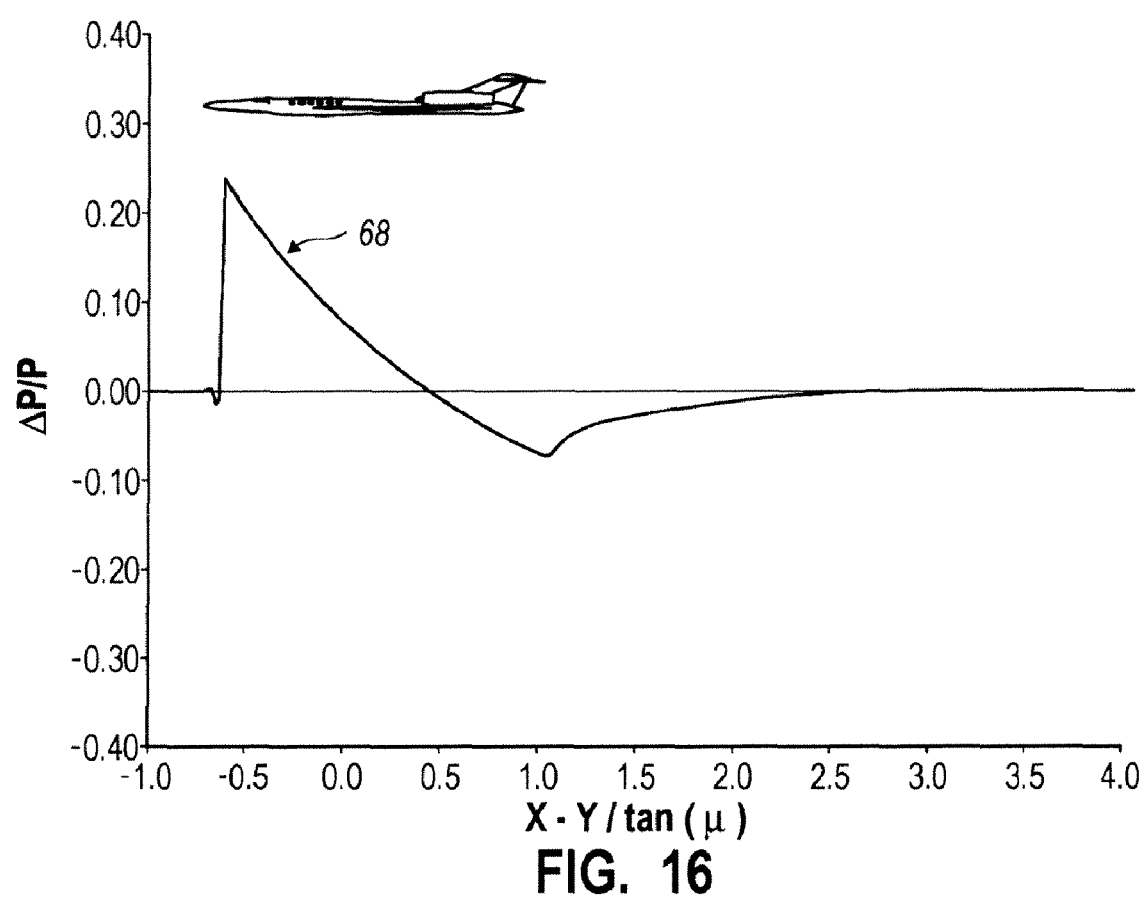
FIG. 16 graphically demonstrates near-body (near-field) pressure disturbances generated by a conventionally configured sonic aircraft generally in association with the length of the aircraft.
Figure 17:
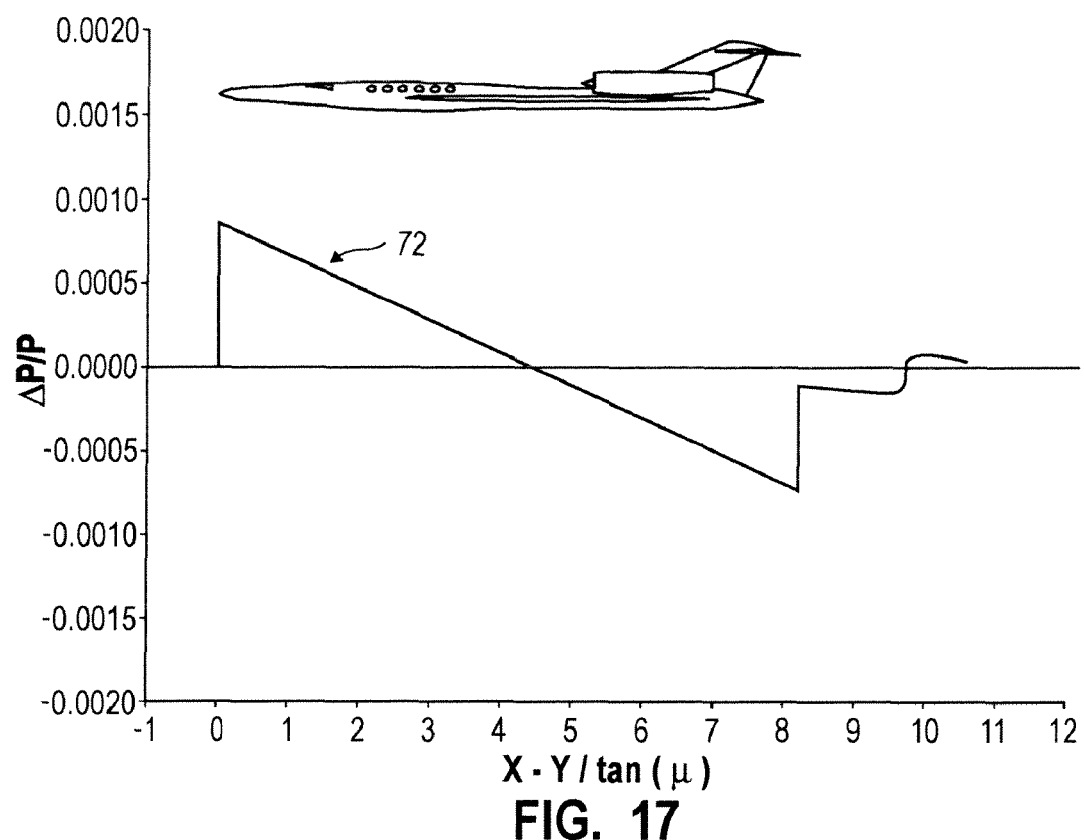
FIG. 17 graphically demonstrates distant or ground-effect pressure disturbances generated by a conventionally configured sonic aircraft roughly in association with the length of the aircraft and causing sonic boom.
Figure 18:
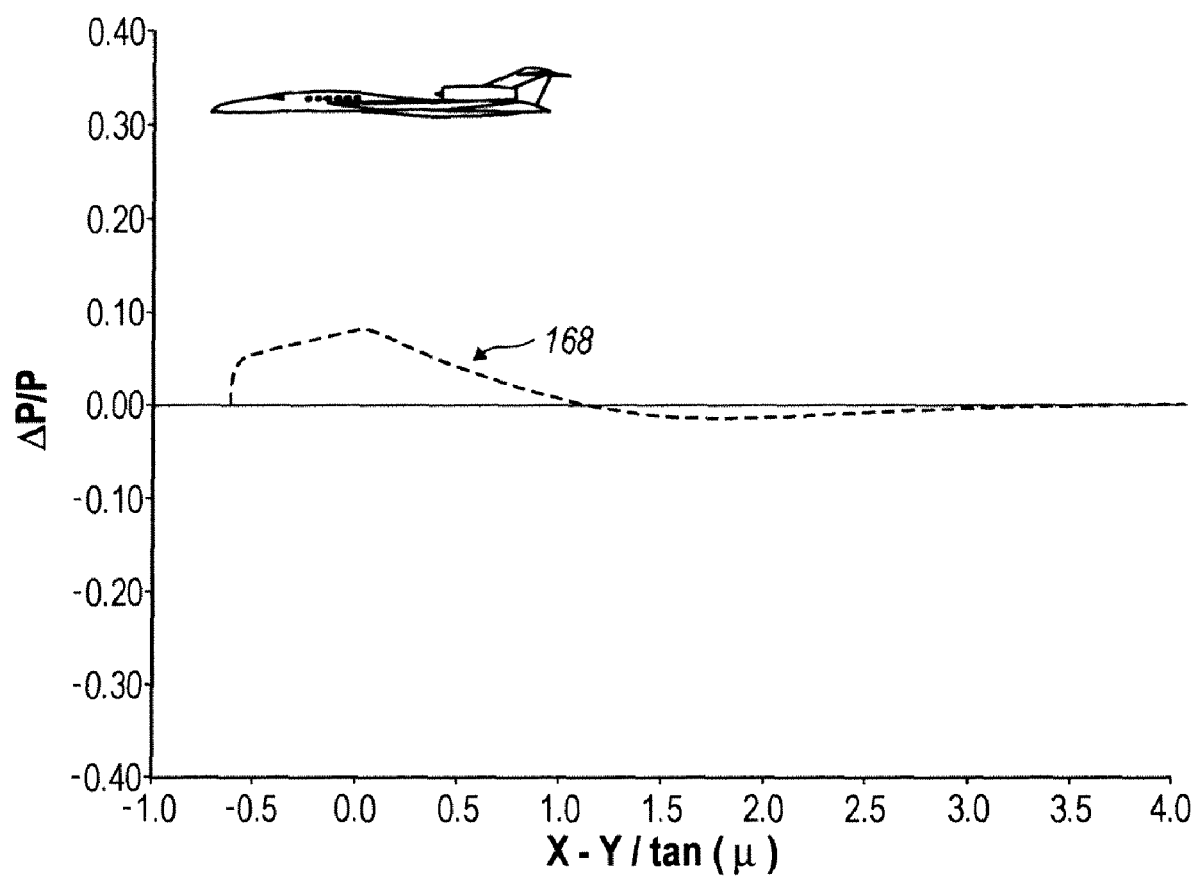
FIG. 18 graphically demonstrates near-body (near-field) pressure disturbances generated by a sonic aircraft configured according to the present invention and generally associated with the length of the aircraft.
Figure 19:
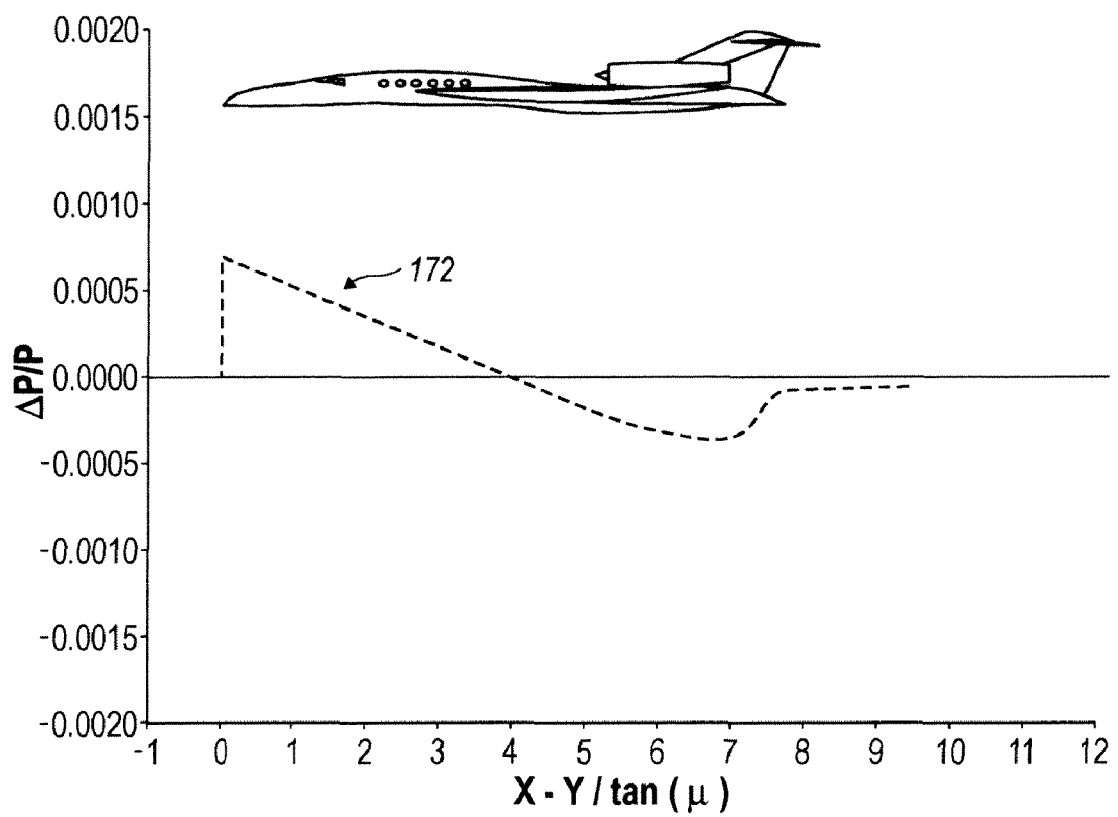
FIG. 19 graphically demonstrates distant or ground-effect pressure disturbances generated by a sonic aircraft configured according to the present invention roughly in association with the length of the aircraft in which sonic boom effect has been minimized.

In FIG. 15, an alternative embodiment of the present invention is illustrated in which the lower profile 160 of the aircraft 120 is uniquely mildly downwardly concave. As in FIG. 14, none of the stronger pressure disturbances generated below the aircraft and behind the disturbance caused by the forward nose 163 of the craft 120 propagate at angles sufficient to result in their coalescence prior to reaching ground level.

Another way of characterizing the present invention is that after configuring an apex 163 of a nose portion 162 of the aircraft 120 to be coincident with a lower profile 160 of the aircraft 120, the aircraft 120 is flown at supersonic speed and a majority of the generated different-magnitude pressure disturbances 168 are diverted above the aircraft 120 thereby establishing an asymmetrical distribution of the different-magnitude pressure disturbances 168, 170 thereabout. In conjunction therewith, a minority of the plurality of different-magnitude pressure disturbances 168 that are diverted below the aircraft 120 are controlled so that ground level sonic boom effects are minimized during supersonic flight.

In another aspect, the invention takes the form of a method for minimizing sonic boom effects caused at ground level by a supersonic aircraft. The method includes manipulating at least one sonic boom contributing characteristic of a supersonic aircraft to assure that a plurality of groundwardly radiating pressure disturbances do not coalesce, one with another, to form an objectionable sonic boom during supersonic flight by the aircraft.

A related characterization of the invention entails manipulating at least one sonic boom contributing design characteristic of a supersonic aircraft to prevent coalescence of groundwardly radiating pressure disturbances, generated during supersonic flight, and thereby establishing a shaped sonic boom signature 180 of the aircraft, at ground level, that is humanly perceptible, but non-objectionable to a perceiving person located on the ground. An example of such a design characteristic is found in the aspect described herein regarding the configuration of a lower profile of the supersonic aircraft so that an apex of a nose portion of the aircraft is coincident with a lower profile of the aircraft. This embodiment of the method further includes flying the aircraft at supersonic speed and diverting a majority of a plurality of generated different-magnitude pressure disturbances above the aircraft thereby establishing an asymmetrical distribution of the different-magnitude pressure disturbances about the aircraft such that the objectionable ground level sonic boom effects are minimized.

Figure 23:
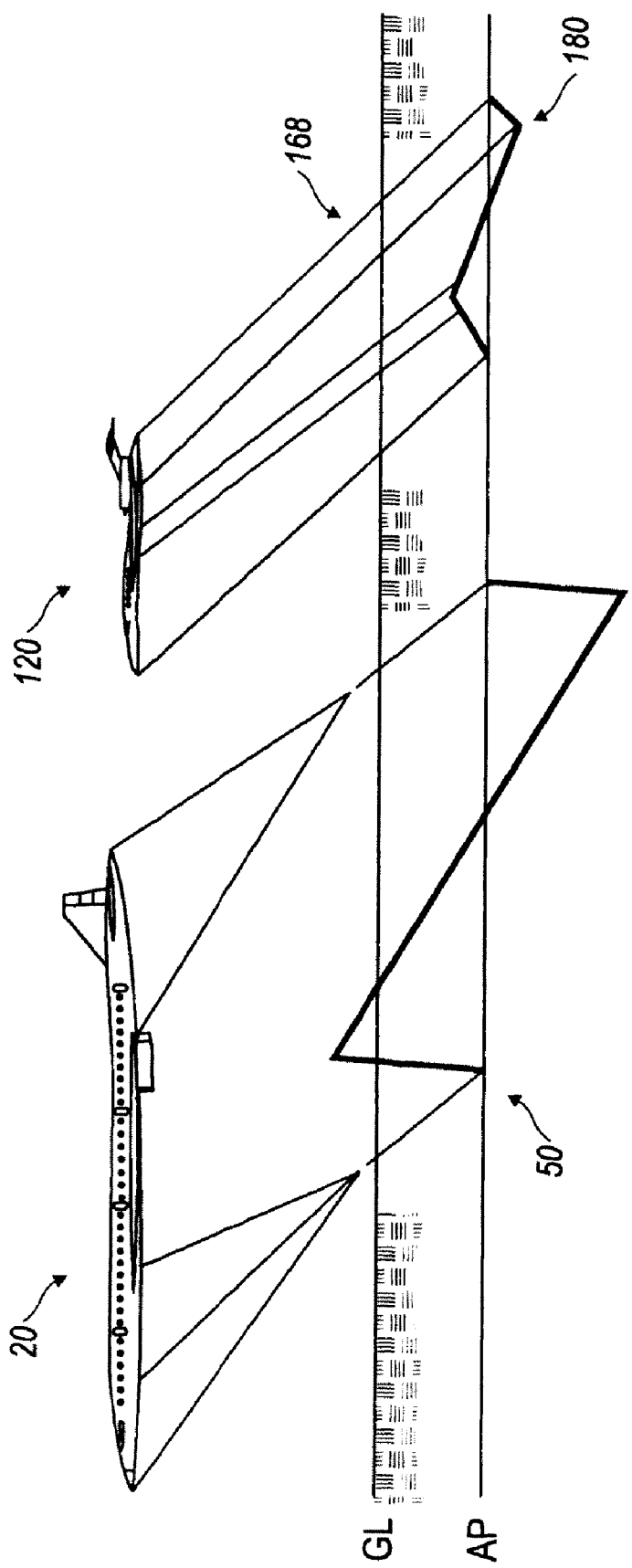
FIG. 23 is a schematic comparative view showing a supersonic aircraft configured according to the teachings of the present invention flying, together with its associated shaped sonic boom signature along side a conventionally designed supersonic aircraft with its generated N-shaped sonic boom signature.

In this regard, FIG. 23 shows a comparison between a conventionally designed supersonic aircraft 20 at the left, including its N-shaped sonic boom signature 50 which is unacceptable to persons located at ground level. On the right, an aircraft 120 configured according to the exemplary embodiment described immediately above, and which produces a non-offending shaped sonic boom signature 180 at ground level, is illustrated.

It should be appreciated that presently regulations generally prevent civil supersonic flight over land. Studies conducted with human participants, however, show that sonic boom effects, at ground level, in and of themselves are not always found to be objectionable by a human receiver. Sonic boom effects are only bothersome to humans located on the ground when they are sufficiently loud and abrupt (strong ΔP and short rise time to peak overpressures) to be objectionable. A parallel may be drawn to noise level regulations instituted with respect to airports. That is to say, take-off noise levels are limited, not precluded by such regulations. Therefore, it is in this vein that the terminology used in characterizing the present invention is found; namely, that a shaped sonic boom signature 180 is established, via manipulation of characteristic(s) of a supersonic aircraft that influence sonic boom effects imposed at ground level, but with the qualifier that they be humanly perceptible and non-objectionable to a perceiving person located on the ground. Studies that quantify such sonic boom effects that are, and are not objectionable to people are known to those persons skilled in these arts, and therefore may be readily applied, from a definitional standpoint, to such recitations found herein.

Figure 24:
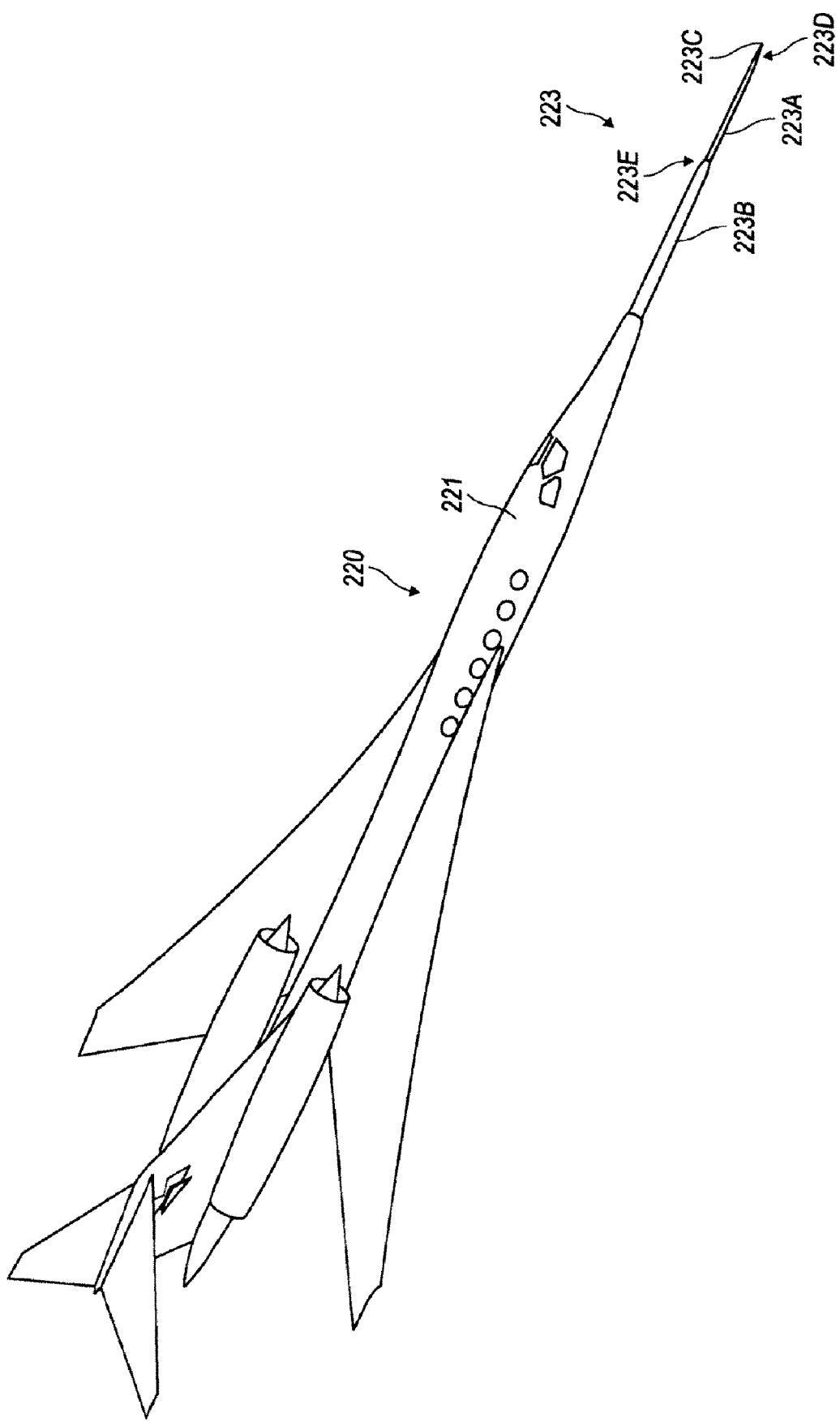
FIG. 24 is a perspective view of a supersonic aircraft having an elongated spike extending from its nose according to the present invention.

In a second aspect, a supersonic aircraft can be configured to include a spike extending from the front thereof. For example, FIG. 24 illustrates a supersonic aircraft 220 having a spike 223 extending forward from fuselage 221, generally in the direction of normal flight. Fuselage 221 can be otherwise conventional, similar to fuselage 21 described above, or it can be specially shaped, similar to fuselage 121 also described hereinabove. Alternatively, fuselage 221 can have other configurations.

Spike 223 preferably can be at least partially retracted into the fuselage of the aircraft on demand. For example, it may be desirable to retract spike 223 into fuselage 221 when the aircraft 220 is flown at subsonic speeds, flown at supersonic speed over areas where sonic booms are deemed acceptable (such as over an ocean), and/or on the ground (to facilitate taxiing and parking).

Figure 25:
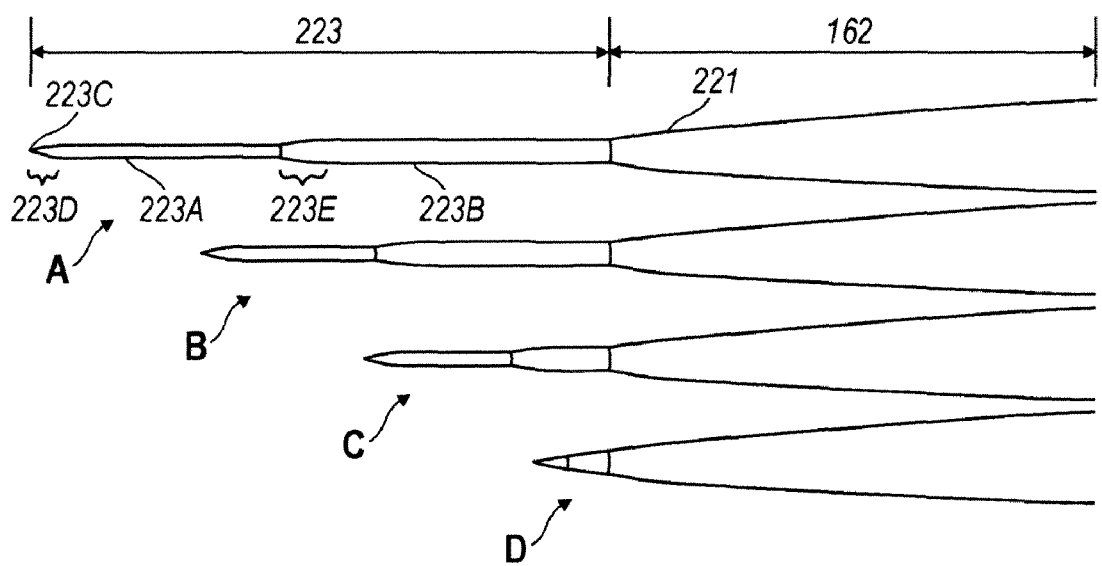
FIG. 25 depicts a series of side elevation views of an aircraft nose outfitted with a telescopically collapsible spike configured according to the present invention, illustrating the spike in various degrees of telescopic extension/retraction.

In a preferred embodiment, spike 223 has a forward section 223A and a rearward section 223B. With reference to FIG. 25, forward section 223A has a generally smaller nominal cross-sectional area than does rearward section 223B, which, in turn, has a generally smaller nominal cross-sectional area than does fuselage 221. Forward section 223A tapers toward (i.e., to, or substantially to) a point 223C through transition region 223D. In alternate embodiments, forward section 223A can taper toward other shapes. For example, but without limitation, forward section 223A can taper toward an edge, such as a knife-edge, which can be oriented vertically, horizontally, or in any other desirable manner.

The transition from forward section 223A to rearward section 223B is through transition region 223E. Transition region 223D is shown as substantially conical and transition region 223E is shown as substantially frusto-conical. These transition regions, however, can have curved or other contours as well. In other configurations of this aspect of the invention, spike 223 can have one or more additional sections between rearward section 223B and fuselage 221. An additional transition region, as discussed above, would be associated with each such additional section. Generally, the nominal cross-sectional area of any such additional section would be greater than the nominal cross-sectional area of a section forward thereof, and smaller than that of a section rearward thereof. However, it is possible that such an intermediate section could have a nominal cross-sectional area smaller than that of a section forward thereof and/or larger than that of a section rearward thereof. Generally, the nominal cross-sectional area of any section of spike 223 is substantially smaller than the nominal cross sectional area of fuselage 221. Although the nominal cross-sectional area of each section of spike 223 is shown to be substantially uniform over the length thereof, the cross-sectional area of each section can vary over the length thereof.

FIGS. 24 and 25 illustrate spike 223 as having substantially cylindrical cross-sections. In other embodiments, it is contemplated that spike 223 can have other regularly or irregularly shaped cross-sections.

Spike 223 can be embodied as a single member. However, it is preferred that sections 223A and 223B (as well as any additional sections, as discussed above) be separate elements which are collapsible in a telescoping manner. FIG. 25 shows a preferred embodiment of a telescopically collapsible spike 223 in an extended position A, a retracted position D, and two intermediate positions B and C.

In alternative embodiments, the spike 223 could be of a single, tapered section. Alternatively, spike 223 can have several sections, one or more of which are tapered continuously over the length thereof. The several sections can be collapsible, or embodied as a single member.

When an aircraft 220 that includes a spike 223 as illustrated in FIGS. 24 and 25 is flown at supersonic speed, the tip of the spike causes an initial shock wave to be formed. Because the spike's cross-section (taken in a generally perpendicular orientation to a long axis of the aircraft 220), is substantially smaller than that of the aircraft's full fuselage or fuselage forebody, this initial shock is substantially weaker than the initial shock that would be created by the full fuselage or fuselage forebody of an otherwise similar aircraft not having a spike. The initial shock on the spike is also well in front of the shock caused by the fuselage forebody and therefore the spike is both weakening the initial shocks and also lengthening the sonic boom signature that is propagated to the ground.

A further weak shock is caused by each further transition region (such as transition region 223E) between adjacent sections (such as sections 223A and 223B) of spike 223. As the number of sections of spike 223 increases, the number of transition regions increases, and the number of weak shocks created thereby increases.

The position and shape of the transition regions define the strength and position of the weak shocks created thereby. The position and shape of these transition regions are selected to reduce coalescence of the weak shocks into a strong shock and thus reduce the intensity of a sonic boom at ground level resulting from these shocks. As discussed above, the optimum position and shape of these transition regions are functions of several variables and can be expected to vary from aircraft to aircraft, based on the particular aircraft's overall configuration. For example, the optimum position and shape of the transition regions may depend on the aircraft's overall length, weight, fineness ratio, wing placement, engine placement, empennage design, altitude, Mach number (speed) and related characteristics. In some embodiments of this aspect of the present invention, the position of such transition regions relative to each other and/or the aircraft's fuselage can be adjusted on demand by incrementally extending or retracting particular sections of the spike. For example, referring to FIG. 25, it may be desirable under certain circumstances to operate the aircraft with spike 223 in position B, position C, or another intermediate position.

Figure 26:
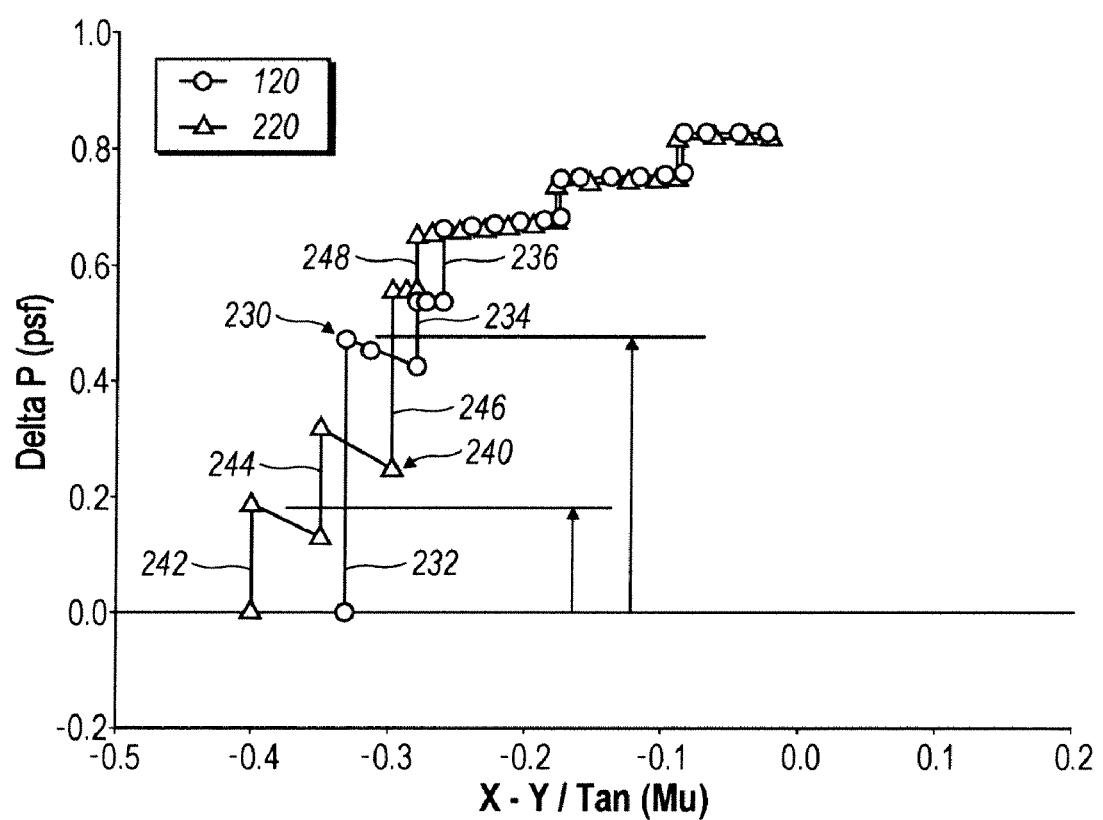
FIG. 26 is a plot of the initial pressure rise at ground level associated with the bow shock created by a conventional aircraft flying at supersonic speed superimposed on a plot of the initial pressure rise associated with the bow shock created by an aircraft outfitted with a spike according to the present invention flying at supersonic speed.

FIG. 26 illustrates graphically the effect of spike 223 on the shock created by an aircraft equipped therewith during supersonic flight. FIG. 26 provides a plot 230 of the pressure rise associated with the bow shock created by an aircraft flying at supersonic speed that has been adapted to project a shaped signature to the ground as described herein, superimposed on a plot 240 of the pressure rise associated with the bow shock created by a similar aircraft having a spike 223 in an extended position and flying at supersonic speed. FIG. 26 shows that an aircraft 220 having such a spike 223 and flown at supersonic speed produces a substantially lower initial pressure rise 242 than the initial pressure rise 232 created by a conventional aircraft of similar size under similar flight conditions. Further, the peak pressure rise resulting from supersonic flight of aircraft 220 having spike 223 is reached through a series of relatively small step increases in pressure 242, 244, 246, 248, whereas the peak pressure rise resulting from supersonic flight of conventional aircraft 220 is reached through a series of fewer, but larger, step increases in pressure 232, 234, 236 (not necessarily shown to exact scale in FIG. 26). Generally, the sonic boom at ground level will be reduced where the peak pressure rise is realized through a longer series of smaller pressure increases, instead of through a shorter series of larger pressure increases.

It should also be appreciated that spike 223 can be used in connection with otherwise conventional supersonic aircraft 20 to effect a reduction in the sonic boom experienced at ground level. Spike 223 also can be used in connection with supersonic aircraft having a specially shaped fuselage 121 as described hereinabove. In certain contemplated configurations, spike 223, itself, can be specially shaped in a manner similar to that of shaped-fuselage 121.

An aircraft according to the present invention can have a second spike similar to spike 223 extending from the aft fuselage or empennage closure thereof in addition to spike 223 extending from the forward fuselage thereof. In alternate embodiments, such an aircraft can have such a rearwardly projecting spike instead of a forward projecting spike 223.

While the foregoing embodiments of the invention illustrate a supersonic passenger jet, it should be understood that the configuration can be used in connection with other types of aircraft and aerospace vehicles.

Whereas the present invention is described herein with respect to specific embodiments thereof, it will be understood that various changes and modifications may be made by one skilled in the art without departing from the scope of the invention, and it is intended that the invention encompass such changes and modifications as fall within the scope of the appended claims.

INDUSTRIAL APPLICABILITY

The present invention finds industrial applicability at least within the supersonic categories of aircraft and aerospace industries.

What is claimed is:

1. A method for configuring and operating an aircraft for minimizing sonic boom effects at ground level during supersonic flight of the aircraft, said method comprising:
configuring an aircraft and flying the aircraft at supersonic speed so that in said supersonic flight, a lower profile of the aircraft is presented and generally groundwardly directed;
generating a plurality of different-magnitude pressure disturbances below the aircraft, and radiating therebelow, and controlling the plurality of different-magnitude pressure disturbances generated below the aircraft so that differentials thereamong are sufficiently minimized that ground level sonic boom effects are minimized during said supersonic flight; and
configuring the lower profile of the aircraft so that no stronger pressure disturbances generated below the aircraft and behind a bow shock pressure disturbance caused by the apex of a nose portion of the aircraft propagate at angles sufficient to result in their coalescence with the bow shock prior to reaching ground level during said supersonic flight.

2. The method of claim 1, further comprising:
conducting said supersonic speed flying with landing gear of the aircraft retracted.

3. The method of claim 1, wherein said lower profile is substantially linearly configured.

4. The method of claim 3, further comprising:
arranging a nose portion of the aircraft so that an apex thereof is coincident the substantially linear lower profile of the aircraft.

5. The method claim 1, further comprising:
orienting the aircraft during said supersonic flight so that the substantially linear lower profile of the aircraft is oriented substantially parallel to onset airflow to the aircraft.

6. The method claim 1, further comprising:
radiating the generated plurality of different-magnitude pressure disturbances below the aircraft and controlling said radiating pressure disturbances below the aircraft to be of lesser magnitude than a plurality of pressure disturbances simultaneously generated above the aircraft and radiating thereabove.

7. The method claim 1, further comprising:
orienting the aircraft during supersonic flight so that the lower profile of the aircraft is leveled to a substantially horizontal orientation.

8. The method of claim 1, further comprising:
configuring the aircraft so that during supersonic flight coalescence of the plurality of different-magnitude pressure disturbances is prevented below the aircraft.

9. The method of claim 1, further comprising:
orienting the aircraft during supersonic flight so that an angle of attack of a fuselage of the aircraft approaches zero.

10. The method of claim 1, further comprising:
selecting the propulsion units to be jet propulsion units.

11. The method of claim 1, further comprising:
configuring a fuselage of the aircraft so that a lower exterior surface thereof establishes the substantially linear lower profile of the aircraft.

12. The method of claim 1, further comprising:
configuring the aircraft so that an apex of a nose portion of the aircraft is coincident with the lower profile of the aircraft;
diverting a majority of a plurality of generated different-magnitude pressure disturbances above the aircraft during supersonic flight thereby establishing an asymmetrical distribution of the different-magnitude pressure disturbances about the aircraft; and
controlling a minority of the plurality of different-magnitude pressure disturbances that are diverted below the aircraft so that ground level sonic boom effects are minimized during supersonic flight.

13. The method of claim 1, further comprising:
manipulating at least one sonic boom contributing design characteristic of the supersonic flying aircraft to assure that a plurality of groundwardly radiating pressure disturbances do not coalesce, one with another, to form a humanly perceptible and objectionable sonic boom during supersonic flight by the aircraft.

14. The method as of claim 1, further comprising:
manipulating at least one sonic boom contributing design characteristic of the supersonic flying aircraft to prevent coalescence of a plurality of groundwardly radiating pressure disturbances generated during supersonic flight and thereby establishing a shaped sonic boom signature of the aircraft, at ground level, that is humanly perceptible and non-objectionable to a perceiving person at ground level.

15. A method for configuring and operating an aircraft for minimizing sonic boom effects at ground level during supersonic flight of the aircraft, said method comprising:
configuring an aircraft and flying the aircraft at supersonic speed so that in said supersonic flight, a lower profile of the aircraft is presented and generally groundwardly directed;
generating a plurality of different-magnitude pressure disturbances below the aircraft, and radiating therebelow, and controlling the plurality of different-magnitude pressure disturbances generated below the aircraft so that differentials thereamong are sufficiently minimized that ground level sonic boom effects are minimized during said supersonic flight; and
configuring the lower profile of the aircraft so that no pressure disturbances generated below the aircraft and behind a bow shock pressure disturbance caused by the apex of the nose portion propagate at angles sufficient to result in their coalescence with the bow shock prior to reaching ground level during said supersonic flight.

16. A method for configuring and operating an aircraft for minimizing sonic boom effects at ground level during supersonic flight of the aircraft, said method comprising:
configuring an aircraft and flying the aircraft at supersonic speed so that in said supersonic flight, a lower profile of the aircraft is presented and generally groundwardly directed;
generating a plurality of different-magnitude pressure disturbances below the aircraft, and radiating therebelow, and controlling the plurality of different-magnitude pressure disturbances generated below the aircraft so that differentials thereamong are sufficiently minimized that ground level sonic boom effects are minimized during said supersonic flight; and
controlling the plurality of different-magnitude pressure disturbances generated below the aircraft by selective arrangement of discontinuities in a lower exterior surface of the aircraft and thereby assuring that ground level sonic boom effects are minimized during said supersonic flight.

17. A method for configuring and operating an aircraft for minimizing sonic boom effects at ground level during supersonic flight of the aircraft, said method comprising:
configuring an aircraft and flying the aircraft at supersonic speed so that in said supersonic flight, a lower profile of the aircraft is presented and generally groundwardly directed;
generating a plurality of different-magnitude pressure disturbances below the aircraft, and radiating therebelow, and controlling the plurality of different-magnitude pressure disturbances generated below the aircraft so that differentials thereamong are sufficiently minimized that ground level sonic boom effects are minimized during said supersonic flight; and
configuring propulsion units mounted upon the aircraft so that pressure disturbances created thereby, below the aircraft, propagate at angles insufficient to result in their coalescence with a bow shock caused by the apex of the nose portion prior to reaching ground level during said supersonic flight.

18. A method for configuring and operating an aircraft for minimizing sonic boom effects at ground level during supersonic flight of the aircraft, said method comprising:
configuring an aircraft and flying the aircraft at supersonic speed so that in supersonic flight, a lower profile of the aircraft is presented and generally groundwardly directed;
generating a plurality of different-magnitude pressure disturbances below the aircraft, and radiating therebelow, and controlling the plurality of different-magnitude pressure disturbances generated below the aircraft so that differentials thereamong are sufficiently minimized that ground level sonic boom effects are minimized during said supersonic flight; and
positioning all inlets of side-mounted jet propulsion units at above-wing locations thereby assuring that downwardly directed pressure disturbances generated by the inlets is substantially blocked from direct propagation below the lower profile of the aircraft during said supersonic flight.

19. A method for configuring and operating an aircraft for minimizing sonic boom effects at ground level during supersonic flight of the aircraft, said method comprising:
configuring an aircraft so that in flight, with landing gear retracted, a lower profile of the aircraft is substantially linear;
arranging a nose portion of the aircraft so that an apex thereof is coincident with the substantially linear lower profile of the aircraft;
flying the aircraft at supersonic speed and orienting the aircraft during said supersonic flight so that the substantially linear lower profile of the aircraft is oriented substantially parallel to onset airflow;

generating a plurality of different-magnitude pressure disturbances below the aircraft, and radiating therebelow, of lesser magnitude than a plurality of pressure disturbances simultaneously generated above the aircraft and radiating thereabove;

controlling the plurality of different-magnitude pressure disturbances generated below the aircraft so that differentials thereamong are sufficiently minimized that ground level sonic boom effects are minimized during supersonic flight; and configuring the nose portion of the aircraft so that vertical cross-sections oriented perpendicular to a long axis of the aircraft are substantially round-shaped.

20. A method for configuring and operating an aircraft for minimizing sonic boom effects at ground level during supersonic flight of the aircraft, said method comprising:

configuring an aircraft so that in flight, with landing gear retracted, a lower profile of the aircraft is substantially linear;

arranging a nose portion of the aircraft so that an apex thereof is coincident with the substantially linear lower profile of the aircraft;

flying the aircraft at supersonic speed and orienting the aircraft during said supersonic flight so that the substantially linear lower profile of the aircraft is oriented substantially parallel to onset airflow;

generating a plurality of different-magnitude pressure disturbances below the aircraft, and radiating therebelow, of lesser magnitude than a plurality of pressure disturbances simultaneously generated above the aircraft and radiating thereabove;

controlling the plurality of different-magnitude pressure disturbances generated below the aircraft so that differentials thereamong are sufficiently minimized that ground level sonic boom effects are minimized during supersonic flight; and configuring the nose portion of the aircraft so that vertical cross-sections oriented perpendicular to a long axis of the aircraft are substantially elliptical-shaped.

21. The method of claim 20, further comprising:
orienting a long axis of the substantially elliptical-shaped vertical cross-sections to be substantially vertical.

22. The method of claim 20, further comprising:
orienting a long axis of the substantially elliptical-shaped vertical cross-sections to be substantially horizontal.

\* \* \* \* \*